(12) United States Patent
Tsao

(10) Patent No.: US 8,713,442 B2
(45) Date of Patent: Apr. 29, 2014

(54) METHOD AND APPARATUS FOR INFORMATION EXCHANGE OVER A WEB BASED ENVIRONMENT

(75) Inventor: Sheng Tai (Ted) Tsao, San Jose, CA (US)

(73) Assignee: Sheng Tai Tsao, Fremont, CA (US)

( * ) Notice: Subject to any disclaimer, the term of this patent is extended or adjusted under 35 U.S.C. 154(b) by 192 days.

(21) Appl. No.: 13/080,007

(22) Filed: Apr. 5, 2011

(65) Prior Publication Data

US 2012/0084658 A1    Apr. 5, 2012

Related U.S. Application Data

(60) Division of application No. 11/732,496, filed on Apr. 2, 2007, and a continuation-in-part of application No. 10/713,904, filed on Aug. 6, 2002, now Pat. No. 7,418,702, and a continuation-in-part of application No. 10/713,905, filed on Aug. 12, 2002, now Pat. No. 7,379,990.

(60) Provisional application No. 60/787,653, filed on Mar. 31, 2006.

(51) Int. Cl.
*G06F 3/14* (2006.01)

(52) U.S. Cl.
USPC ........... 715/736; 715/760; 709/201; 709/203; 709/205; 707/740

(58) Field of Classification Search
USPC .......... 715/200–277, 700–867; 700/701–866; 709/201–229; 705/50–79; 345/30–111
See application file for complete search history.

(56) References Cited

U.S. PATENT DOCUMENTS 7,865,545 B1 *  1/2011  Estrada et al. ................ 709/201
2011/0185292 A1 *  7/2011  Chawla et al. ................ 715/760

* cited by examiner

*Primary Examiner* — Ruay Ho
(74) *Attorney, Agent, or Firm* — James Zhu, Jun He Law Office, PC

(57) ABSTRACT

Sharing and exchanging information via world wide web is a way of life in modern society. The dynamic workspace technology together with customized posting and removing operations provide people a much efficiently and flexibly communication platform for sharing and exchanging information across a global environment.

20 Claims, 18 Drawing Sheets

An example of resource objectives on systems and can be assigned to each group or each user' work space.

Fig. 1: A Typical CCDSVM platform with Multiple Clients

Fig. 2A: A variation of the CCDSVM platform for web-browser based communication:

Fig. 2B: A variation of CCSDVM platform, the degenerated CCDSVM with only control system and without provisioned systems, and to be accessed by massive client systems.

Fig. 3: The Software of WCUWE for typical CCDSVM:

Fig. 4A: Dynamic work space (central location for share) on Control system.

Fig. 4B: an example of resource may be assigned to a user-group common work space.

Fig. 4C: an example of user private work space.

Fig. 5: An example of resource objectives on systems and can be assigned to each group or each user' work space.

Fig. 6A: An example of displaying a web-page with 4 sections in web-browser of user X in user-group-1 during an interactive online meeting.

Fig. 6B: An example of displaying a web-page with 4 sections in web-browser of user Y in user-group-1 during interactive online meeting.

Fig. 6C. An example of displaying a web page in a web browser for user X in user group-1 before interactive online meeting.
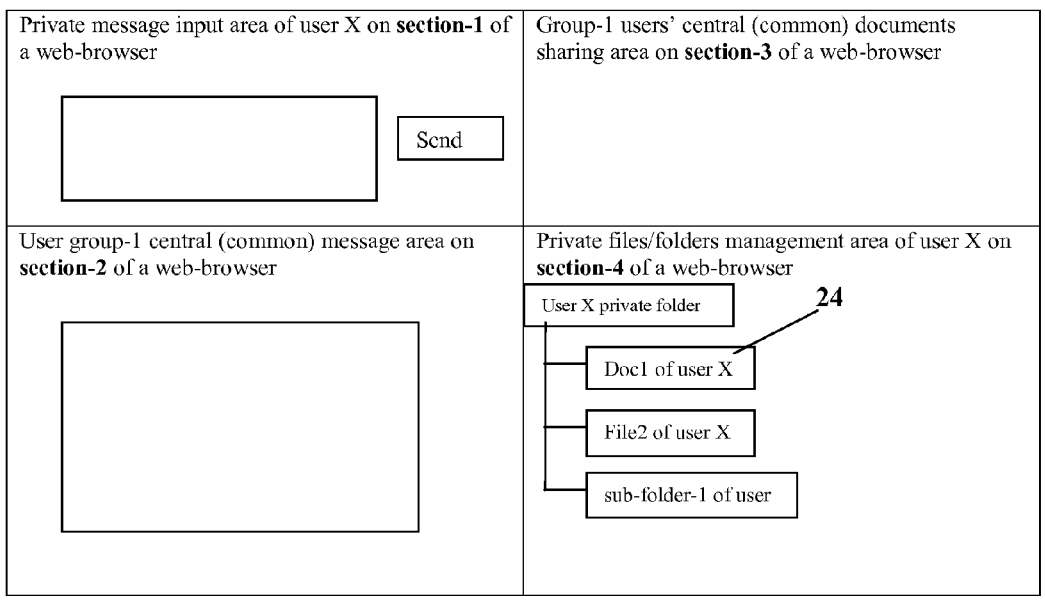
Fig. 6D: An example of display a web-page with 4 sections in browser of user Y in user group-1 before interactive online meeting.
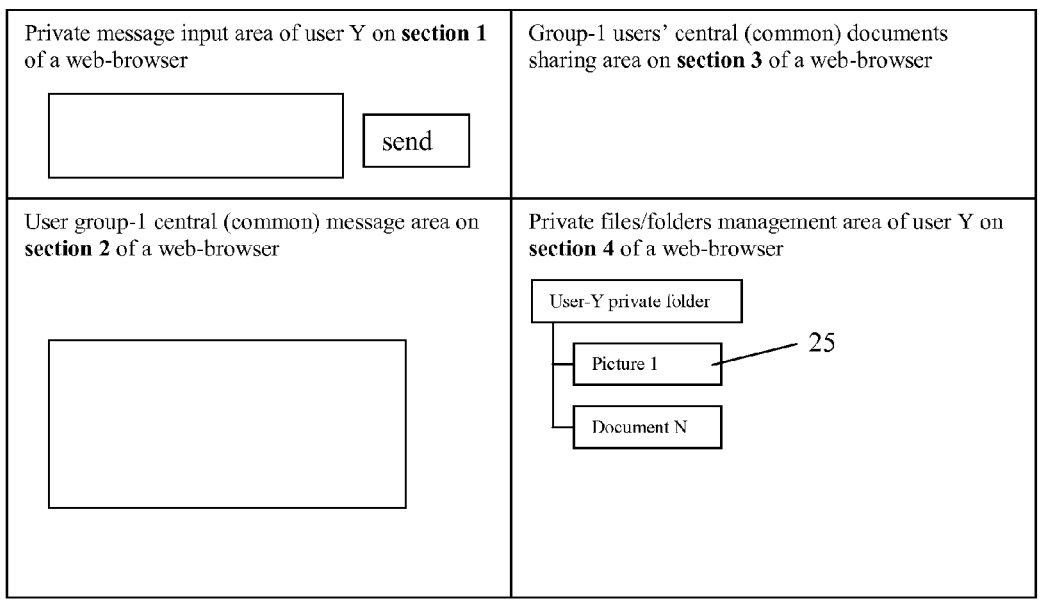

Fig. 6E: An example of displayed web-page that each massive online user can access and view from each of their browser without login to CCDSVM during said user X and user Y in user-group-1 online meeting.

Fig. 7A: Non-group based one-to-one peer-to-peer post messages and folders of user X

Fig. 7B: Non-group based one-to-one peer-to-peer post messages and folders of user Y

Fig. 8A: An example web graphic presentation view of assigned resources in a user X's private work space.

Fig. 8B examples of web-based graphic presentation of assigned resource in the private work space of user Y.

Pop-up menu for folder

Fig. 8C: An example web graphic presentation view of user Y's private work space after user X dynamically posted and shared "folder 2" in user X's private space.

Fig. 9A: an example of pop-up menu for folder

| Add folder |
|---|
| Rename |
| Delete |
| Copy/Past |
| Move |
| Post/Share |
| Un-Post |
| Upload |
| Set Mode |

Fig. 9B an example of pop-up menu for file

| Rename |
|---|
| Delete |
| Copy/Past |
| Move |
| Post/Share |
| Un-Post |
| Upload |
| Set Mode |

Fig. 10A an example of non pop-up operation menu for folder:

| Add folder | rename | delete | Copy/past | move | Post/share | Un-post | upload | Set mode |
|---|---|---|---|---|---|---|---|---|

Fig. 10B an example of non pop-up operation menu for folder:

| rename | delete | Copy/past | move | Post/share | Un-post | Set mode |
|---|---|---|---|---|---|---|

Fig. 11: an example of center view of list of posted files or folders in file & folder area of a private work space of a user X in a special personal share management section of a web-page.

| File or Folder Name | On System | Share to Who | |
|---|---|---|---|
| My-video jpg file | System-1 | Jane | Delete shared? |
| Project plan | Engineer-3 | Jim | Delete shared? |
| C program code for web | Support-2 | John | Delete shared? |
| Picture of building | System-1 | Jane | Delete shared? |
| Engineer Drawing | Engineer-3 | Jim | Delete shared? |
| Patent application-v1 | System-1 | Ted | Delete shared? |
| Folder 2 | System 2 of system group-Λ | User Y | Delete shared? |
| | | | |
| | | | |
| | | | |
| | | | |

METHOD AND APPARATUS FOR INFORMATION EXCHANGE OVER A WEB BASED ENVIRONMENT

PRIORITY

This application is a divisional application for U.S. patent application Ser. No. 11/732,496 of filed on Apr. 2, 2007. The application Ser. No. 11/732,496 has claimed the benefit of the priority of the U.S. provisional application No. 60/787,653. The application Ser. No. 11/732,496 is also the continuation-in-part of U.S. patent application Ser. No. 10/713,904, filed on Aug. 6, 2002 and converted from the U.S. provisional application No. 60/401,238. The application Ser. No. 11/732,496 is also a continuation-in part of U.S. patent application Ser. No. 10/713,905, filed on Aug. 12, 2002 and converted from the U.S. provisional application Ser. No. 60/402,626. The patent application Ser. No. 10/713,904 now is a U.S. Pat. No. 7,418,702. The patent application Ser. No. 10/713,905 now is a U.S. Pat. No. 7,373,990. All of the above prior applications are incorporated herein by reference in each one's entirety.

FIELD OF THE INVENTION

The present invention generally relates to communication network. More specifically, the present invention relates to web based communication system.

BACKGROUND OF THE INVENTION

With increasing popularity of using the Internet and World Wide Web ("the Web") for the rapidly changing digital world, individuals as well as enterprises, exchange (or swap) large volumes of information through the Web. The demand for larger and faster information exchange has increasingly grown in recent years. For example, various business meetings and conferences are conducted over the Web with attendees scattered around the world. To enhance the communication between the meeting attendees, not only voice (and/or image) information is important, but information exchange can also be critical.

Fast, volume, and secure information exchange is important in enhancing the efficiency of a communication network. A problem associated with a conventional network is limited size and speed. For example, a typical email system limits the size of each email, such as 10 megabytes, thereby a reasonable speed of delivery of such email can be achieved. Another 1 method and apparatus for information exchange over a web based environment May 3, 2013 problem associated with a conventional network is that various hosts require software installation before a user can use their platform. For example, Skype™ requires a user to install its proprietary software on the user's systems before it allows the user to use its platform.

Accordingly, there is a need in the art to provide a faster, more secure, volume information exchange over the Web.

SUMMARY OF THE INVENTION

The present invention relates to a method and apparatus for information exchange over a web environment.

With the development of central controlled distributed scalable virtual machine (CCDSVM) and the web-based computer user working (operating) environment (WCUWE), the problems mentioned in the previous section can easily be solved by introducing a "dynamic work space" technology of this invention within the frameworks of the CCDSVM and the WCUWE.

With the dynamic work space technology, one or more login users of the CCDSVM, each using a browser residing in any computing system from anywhere, can instantly perform various tasks. For example, each user can post or un-post messages, files, folders, or other resources residing in a plurality of computing systems of the CCDSVM in group model or in 1-to-1 personal model to one or more other user across a network. This technology will also achieve larger scales of secure information exchange without size limitation and installation of special software.

The implementation of this invention has provided users with a web-browser based, 1-click system that is capable of securing exchanges of messages, files, folders, or other resources residing in computing systems crossing network domains without size limitation.

Additional features and benefits of the present invention will become apparent from the detailed description, figures, and claims set forth below.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 6C illustrates an example of displaying a web-page with 4 sections via a web-browser of a user X in a user group-1 before the interactive online meeting in accordance with another embodiment of the present invention;

FIG. 6D illustrates an example of displaying a web-page with 4 sections via a web-browser of a user Y in a user group-1 before the interactive online meeting in accordance with another embodiment of the present invention;

FIG. 9A is an example of a pop-up menu for operating folders in accordance with one embodiment of the present invention;

FIG. 9B is an example of a pop-up menu for operating files in accordance with another embodiment of the present invention;

FIG. 10A is an example of a non pop-up operation menu for operating folder in accordance with one embodiment of the present invention;

FIG. 10B is an example of a non pop-up operation menu for operating file in accordance with another embodiment of the present invention;

FIG. 11 is an example of a displayed list of posted files or folders in a sharable file & folder area of a common work space of a user X in accordance with one embodiment of the present invention.

DETAILED DESCRIPTION

Figure 1:
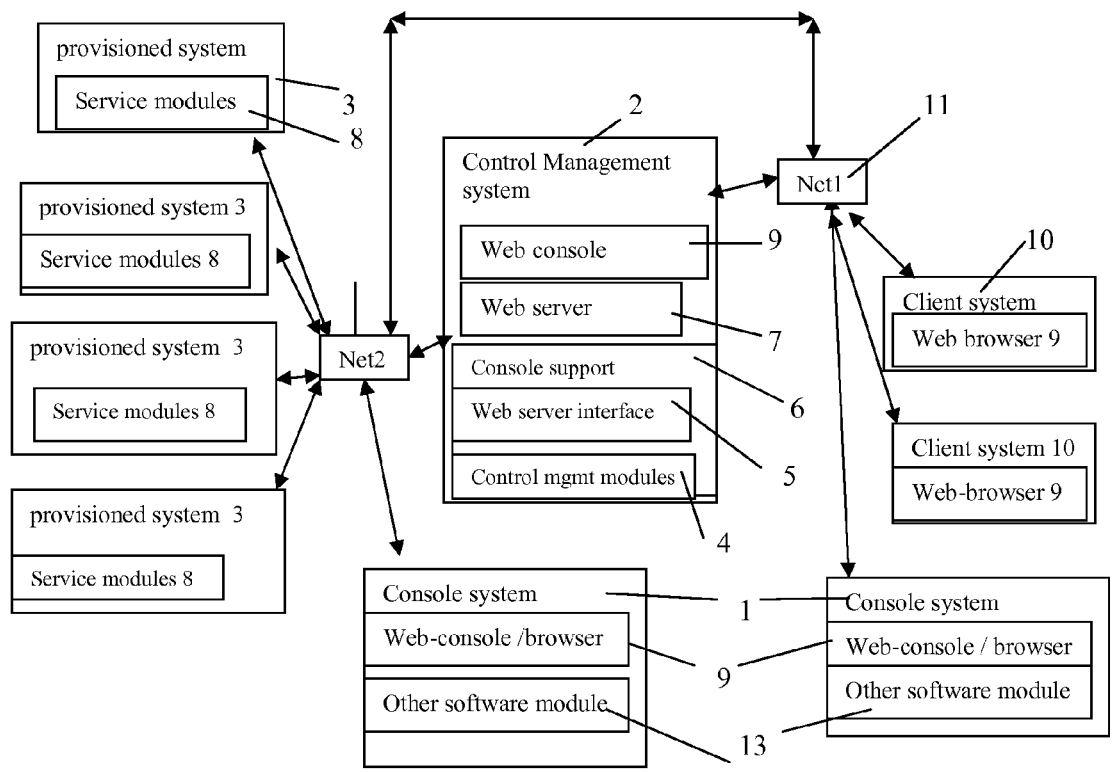
FIG. 1 is a block diagram illustrating a layout of a CCDSVM with a central control management system, a plurality of provisioned systems, client systems, and console systems in accordance with one embodiment of the present invention.

Embodiments of the present invention are described herein in the context of a method, system and apparatus for providing a web based communications network with fast, volume, and secure information exchange. Those of ordinary skill in the art will realize that the following detailed description of the present invention is illustrative only and is not intended to be in any way of limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures described herein may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. Where a method comprising a series of process steps is implemented by a computer or a machine and those process steps can be stored as a series of instructions readable by the machine, they may be stored on a tangible medium such as a computer memory device (e.g., ROM (Read Only Memory), PROM (Programmable Read Only Memory), EEPROM (Electrically Eraseable Programmable Read Only Memory), FLASH Memory, Jump Drive, and the like), magnetic storage medium (e.g., tape, magnetic disk drive, and the like), optical storage medium (e.g., CD-ROM, DVD-ROM, paper card and paper tape, and the like) and other known types of program memory.

Those of ordinary skill in the art will realize that the following detailed description of the present invention is illustrative only and is not intended to be in any way limiting. Other embodiments of the present invention will readily suggest themselves to such skilled persons having the benefit of this disclosure. It will be apparent to one skilled in the art that these specific details may not be required to practice to present invention. In other instances, well-known circuits and devices are shown in block diagram form to avoid obscuring the present invention. In the following description of the embodiments, substantially the same parts are denoted by the same reference numerals.

While particular embodiments of the present invention have been shown and described, it will now be apparent to those skilled in the art having the benefit of this disclosure that many more modifications than mentioned above are possible without departing from the inventive concepts disclosed herein. Therefore, the appended claims are intended to encompass within their scope all such modifications as are within the spirit and scope of this invention.

The present invention can be implemented by a web based system operated in a network infrastructure, such as a central controlled distributed scalable virtual machine ("CCDSVM"). FIG. 1 illustrates a CCDSVM in accordance with an embodiment of the present invention. The CCDSVM includes a group of provisioned systems 3, a control management system 2, console systems 1, and client systems 10. The control management system ("control system") 2 is configured to control a group of systems ("provisioned system") 3. The console systems ("console systems") 1 provide management for the CCDSVM while the client systems 10 ("client systems") initiate access to the provisioned systems 3 and/or the control system 2 via a web-browser across a network infrastructure, such as an Intranet, the Internet, and/or a local area network ("LAN").

The network infrastructure ("network") includes all necessary hardware and software that facilitate various users from different geographic locations to communicate through the Internet, an Intranet, and/or a LAN. The hardware of the network includes wired network connection media, wireless connecting media, circuitry components, and communication equipments. The network connection media includes various cables such as Ethernet and/or optical fiber. The wireless connecting media is capable of establishing wireless communication links through air. The circuitry components include processor, data bus, memory devices, and/or circuit board. The communication equipments, such as switches, routers, gateways, and/or adapters, are used to provide a communications network. It should be noted that there are other possible elements of communication equipment that may be needed to form a communication link, but they are not necessary to understand the present invention.

The software infrastructure includes Internet Protocol ("IP") addresses and system name identification software such as Domain Name Server ("DNS"), firewall software, IP gateway set-up software, IP broadcast, and so forth. The communication protocols over the network could be IP-based standard or non-standard proprietary protocols such as Hypertext Transfer Protocol ("HTTP") over Transmission Control Protocol/Internet Protocol ("TCP/ IP") or Simple Object Access Protocol ("SOAP") over TCP/IP. It should be further noted that some IP based protocols are proprietary protocols and some are non-IP based protocols.

A web-browser is an application program that allows a user access to information across the Web. The web browser could be, for example, a Windows Internet Explorer ("IE"), Fire-Fox, Netscape, and/or Mozillar. A web-browser could also be a proprietary software, which uses web-protocols such as HTTP, WAP, SOAP for communication across the network. The web-browser can be implemented with any suitable programming languages such as C, C++, Java, or XML, or a combination of the suitable languages.

A web page, on the other hand, is encoded with information displayable through the web-browser. The web page may be hosted by a web server in a web server system and can be sent or retrieved by using the web-browser.

The provisioned systems 3, client systems 10, console systems 1, and control management system 2 are computational systems that could be a server system, desktop or laptop system, handheld devices such as PDA, wireless phone, and so forth. The computational systems include CPUs, storage devices, and memory controller. The storage devices include internal memory such as read-only memory ("ROM") and/or random access memory ("RAM"). The storage devices may further include external storage devices such as magnetic disks or tapes, which include redundant array of inexpensive drives ("RAID"), just bunch of disk drive ("JBOD") and memory stick. The associated storage controller can be Integrated Drive Electronics ("IDE"), Small Computer System Interface ("SCSI"), Fiber optical controller, or a combination of above-mentioned devices.

The computational systems also include a native non-embedded or real-time embedded OS, which could be Linux, or Windows, Unix, or proprietary OS. It should be noted that the present invention may include multiple control systems at different layers in a system configuration topology wherein each of the control systems is capable of communicating with each other through a network. The control systems at middle layers play dual roles as both a control system and a provisioned system in the system configuration topology.

FIG. 1 illustrates a CCDSVM platform with multiple clients in accordance with one embodiment of the present invention. The CCDSVM includes the console systems 1, control management system 2, provisioned systems 3, and networks 11-12, wherein the networks 11-12 are used inter-connecting with all systems of the CCDSVM and the client systems 10.

The console system 1 is a computational system having a web-browser ("web-console") 9 wherein the web-browser 9 is used by privileged users for accessing the CCDSVM platform. The web browser 9, which could reside in any computing system, permits a user access to information in the CCDSVM by following, in one example, a web URL link. For example, a privileged user enters a web URL of "https://69.107.28.123/stt/sttwebos" on a command line of web browser 9 screen and once the link is established, the user can obtain information hosted by the web-based computer user work/operation environment ("WCUWE"). The console system 1, in one embodiment, further includes software modules 13, wherein the software modules 13 may be used to facilitate communication between the console system 1 and the control management system 2.

The control system 2, in one embodiment, is a server system, a desktop or a laptop computer with the memory and storage capabilities. The control system 2 includes a web server software 7 and a console supporting software 6. The console supporting software 6 includes web server interface software modules 5 and control management software modules 4. The control management system 2 may also have web-browser 9 used as a web-console 9 of the control system 2. The web server software 7 sends/receives data to/from the web-console 9 of the console system 1 or the client system 10 or the control system 2. The web server software 7 is configured to provide secure sockets layer ("SSL") encryption for encrypting the data before its transmission, thus to enhance the security. The web server software 7 could be commercially available software such as Apache™ from open source, or IIS from Microsoft or a proprietary software. The web server software modules 7 and console support 6 software modules 6 can be implemented by any suitable or a combination of any suitable programming languages such as C, C++, Java, JavaScript, HTML, or XML.

The console supporting software 6 communicates with the service software modules 8 of each of the provisioned systems 3. The web server interface 5 of the console support software 6 is capable of providing special functions that are otherwise performed by the web server 7. If no provisioned system 3 is coupled to the CCDSVM platform, the control management system 2, in one embodiment, is reconfigured to continue monitoring systems over the network and the CCDSVM platform is also reconfigured to become a single stand-alone system, as shown in FIG. 2B. Users can access and/or obtain data objects or system resources via the web-browser 9, which can be resided at any client system 10 or console system 1.

The provisioned system 3 is a computational system, which comprises suitable native operating system ("OS"). The provisioned systems 3 can be automatically provisioned by the control system 2 through an automatic system service pool construction protocol. The Provision process, also known as pooling process, is a method allowing the control system 2 to control one or more network systems 3 by reconfiguring the network systems. For example, when a provisioned system 3 boots up via a communication protocol, the control system 2 obtains provisioned system's name, IP address, and other system information, wherein the system information includes network information, storage information, file system information and so forth. Each provisioned system 3 can be monitored, accessed, and/or operated by a user(s) through the web-browser 9 of a console system 1. In an alternative embodiment, provisional system 3 is operated by users at the client systems 10 via a control system 2 with proper user' authentication. Each provisioned system 3 contains service software modules 8, which is used to communicate with servers across across a network. For example, the service software modules 8 of the provisioned system 3 can communicate with the control management software modules 4 of the control system 2 to carry out tasks for viewing or operating resources of the provisioned system 3. The service software 8 can also communicate with the web-browser 9 of the client system 10 or console system 1 to transfer data between them or deliver service to them, or to communicate with another provisioned system 3 to send or receive data.

The service software modules 8 may include special software modules having compatible functionalities of the web-server software 7 of the control system 2 and to dedicate handling HTTP protocol or other web protocols if there is needs for web-based communication with the client 10 or with other provisioned systems 3 or with the control system 2. The software modules 8 could be commercially available web server software 7 or any proprietary software. The service software modules 8 could be implemented with any suitable programming languages such as C, C++, Java, or JavaScript.

Net 11 and Net 12 are the network infrastructures that are capable of providing communication links between the control management system 2, console systems 1, client systems 10, and/or provisioned systems 3 without limits.

The client systems 10 may not be a part of the CCDSVM, but with the permission and authorization, users from the web-browser 9 of the client system 10 can login to the CCDSVM and access the permitted resources of the CCDSVM by following a web URL link of the CCDSVM. While the privileged users can obtain, manage, access, and/or operate system resources of the CCDSVM through the WCUWE, regular (non-privileged) users at the client systems 10 may be permitted to access only limited system resources of the CCDSVM.

The CCDSVM configuration, in one embodiment, includes four data flow paths. The first data path is a communication links between the web browser 9 of the client host 10 (or console host 1 or control management system 2) and the web handling software on the control system 2 (such as the web-server 7 and/or console support software 6). With this path of data flow, whenever a user sends a request from the web-browser 9 to the web-server 7 and further passed to the console support software 6, the console support software 6 collects required information from each target systems and converts them into standard structured information (web-format) for web communication. The targeted system could be one of the provisioned systems 3 or the control system 2. The information collected by the console support software 6 of the control system 2 could be the system status, storage information, network information, user authentication profile, file system information, or files & folders information on the control system 2, or on any targeted provisioned system 3. The console support software 6 then passes this converted structured information to web server software 7 and further transmits it to the web-browser 9 through communication link Net 11 and/or Net 12 so that the collected information can be displayed and viewed by a conventional web browser 9, as shown in FIG. 1.

The communication protocols used between the web-browser 9 of the client system 10 (or the console system 1 or the control system 2) and the web server 7 of the control system 2 could be HTTP, HTTPS (SSL encrypted HTTP protocol) or any suitable web protocols for web communication, which could successfully send or receive the data across the world wide web, or could also be other standard or proprietary IP-based on non-IP-based protocols. This data path may be referred to as the console support software 6 transmits data to or receives data from the web-browser 9.

The second data path is the data flow through communication links between the control system 2 and the provisioned systems 3. Requests targeted to a provisioned system 3 are passed from the console support software 6 of the control system 2 to the service modules 8 of the provisioned systems 3 through communication link network 12. When those requests are received by the targeted provisioned system, the service modules 8 of the provisioned system 3 carry out the requested tasks, and then send a response back to the console support software 6 of the control system 2. The implementation of the actual products of this invention with the second data path may use proprietary TCP/UDP/IP based protocols for the communication between the provisioned systems 3 and the control system 2. However, other standards or proprietary IP-based or any suitable non-IP-based protocol are also possible. The communication protocols used between the console support software 6 of the control system 2 and the service modules 8 of the provisioned system 3 can be any suitable IP based or non-IP based protocols, whichever is suitable to transmit data between them. The typical data flow through this path could be the boot message, system status, network information, or storage information of the provisioned system 3 without limits.

The third data path is the data flow between the provisioned systems 3 and the client system 10 or the console system 1 via the communication link 11-12. Referring back to FIG. 1, the console support software 6 of the control system 2 may present a web link, which points to an object on a provisioned system 3, to a user working on a web-browser 9 of the client system 10 or the console system 1 or the control system 2. The object pointed by the web link resides in the provisioned system 3 could be a text file, MPEG video, PDF document, MS Power Point, Word documentation, etc. It also could be a link of another web service program. From the web browser 9, a user can directly access the information residing in a provisioned system 3 pointed by the web link without go through the control system 2 again. In this case, the service modules 8 of the provisioned system 3 also include the web server software modules 7 or equivalent one to directly support the web browser 9 as mentioned before. The communication protocols with the third path could be the web protocols such as HTTP or WAP. Alternatively, the communication protocols can be other standards or proprietary IP-based or non-IP-based protocols. To simplify the discussion, the data transmitted on this path will be mentioned as the service software module 8 that send data to or receive data from the web-browser 9 and vice versa.

The fourth data path is data flow through communication link between the provisioned system 3 and another provisioned system 3. With this path, the service modules 8 of one provisioned system 3 can directly transmit data or information to the service modules 8 of another provisioned system 3 via a communication link provided by the Net 12 without going through the control system 2. The implementation of the actual products of this invention, for example, uses a proprietary IP-based protocol for communications between the two provisioned systems 3. The principle of this invention, however, does not rely on or limit to proprietary protocol. It should be noted that other standard or proprietary IP-based or any suitable non-IP-based protocol may also be possible. The data and information transmitted through the fourth data path can be various types. For example, a user through a web-browser 9 may open a file folder on a provisioned system 3 and the user can further instruct to transfer a file from the current provisioned system 3 to another provisioned system 3 by a mouse click. The data file will then be transferred directly between the two provisioned systems 3 without going through the control system 2.

Figure 2A:
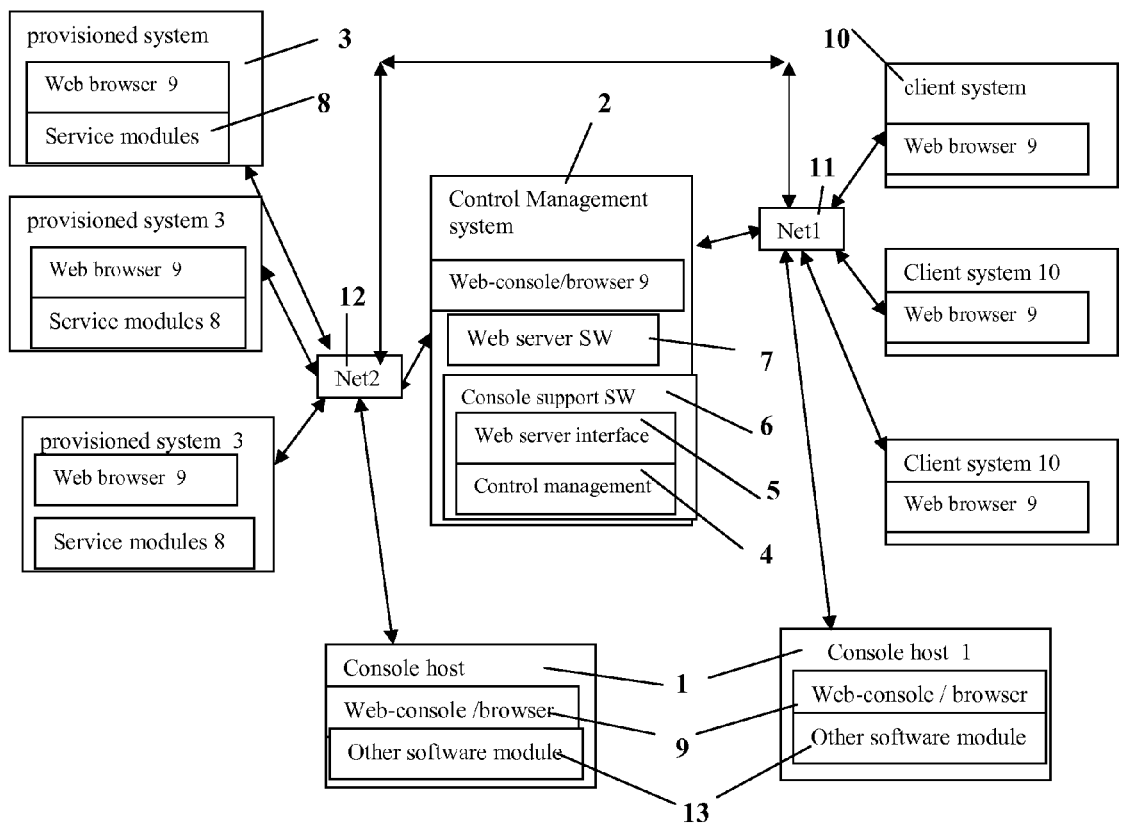
FIG. 2A is a block diagram illustrating a layout of a CCDSVM with which users from their web-browser of the provisioned system can communicate with each other in accordance with another embodiment of the present invention.
Figure 2B:
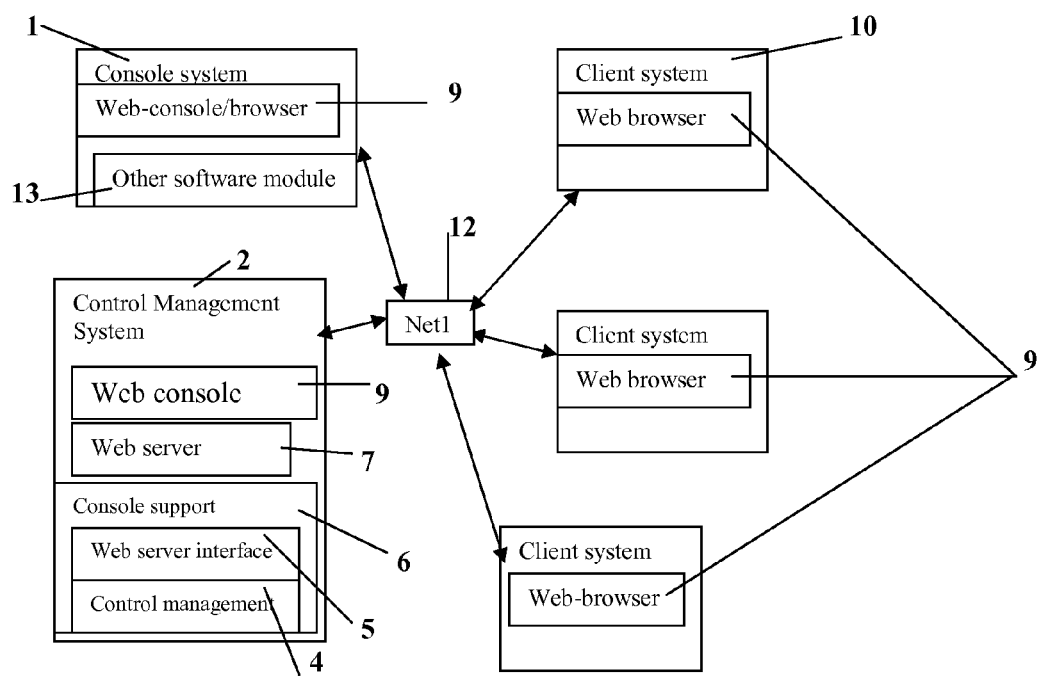
FIG. 2B is a block diagram illustrating a layout of a CCDSVM with only a single control management system to be accessed by a plurality of client systems in accordance with another embodiment of the present invention.

FIG. 2A illustrates a variation of the CCDSVM platform for the web browser-based communication in accordance with one embodiment of the present invention. The CCDSVM platform illustrated in FIG. 2A is similar to the platform illustrated in FIG. 1 except every provisioned systems 3 includes a web-browser 9. Thus, with proper authentication process, each user of the provisioned systems 3 may access, manage their own provisioned system 3 from a web-browser 9 located either on their own local provisioned system 3 or on any client system 10 anywhere across a network. It should be noted that when a user is registered with a provisioned system 3, the user is authorized to access provisioned system 3 locally but not access the CCDSVM. On the other hand, when a user is registered with the CCDSVM, the user may be then authorized to access one or multiple provisioned systems 3 and the control system 2 of the CCSDVM.

FIG. 2B illustrates another example of a variation of the CCDSVM, in which there is no provisioned systems 3 in the CCDSVM. Thus the Control system 2 can run on its own and the CCDSVM has degenerated into a single stand-alone system (FIG. 2B). Thus, users each through a web-browser 9 on any client system 3 (or on console system 1, or on stand-alone control system 2) is allowed to access and operate the permitted data objects and system resources on the stand-alone control system 2.

Unless specifically specified, the console support software modules 6 of the control system 2, the provisioned systems 3, the service software modules 8 of provisioned system 3, and the web-browser 9 on the control system 2, the client system 10, and the console system 1 all together are referred to the CCDSVM platform illustrated in FIG. 1.

Figure 3:
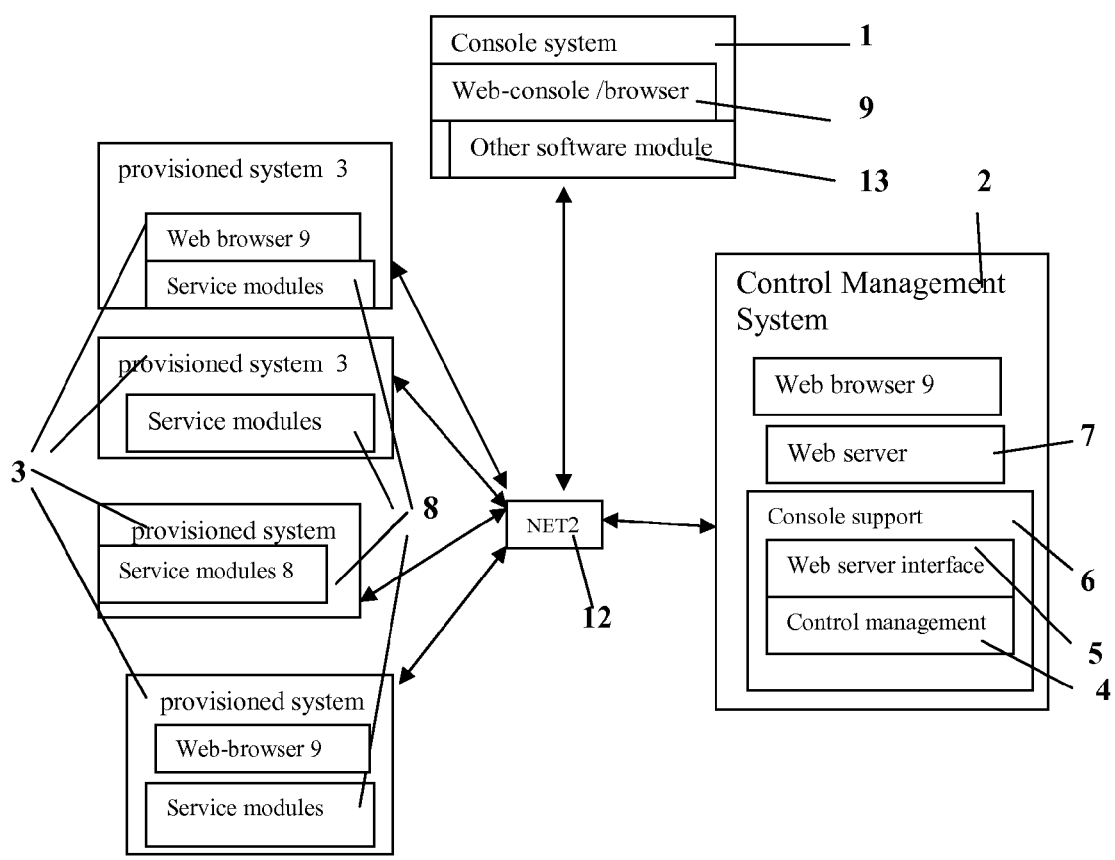
FIG. 3 is a block diagram illustrating an example of a software structure of the WCUWE for a CCDSVM in accordance with one embodiment of the present invention.
Figure 5:
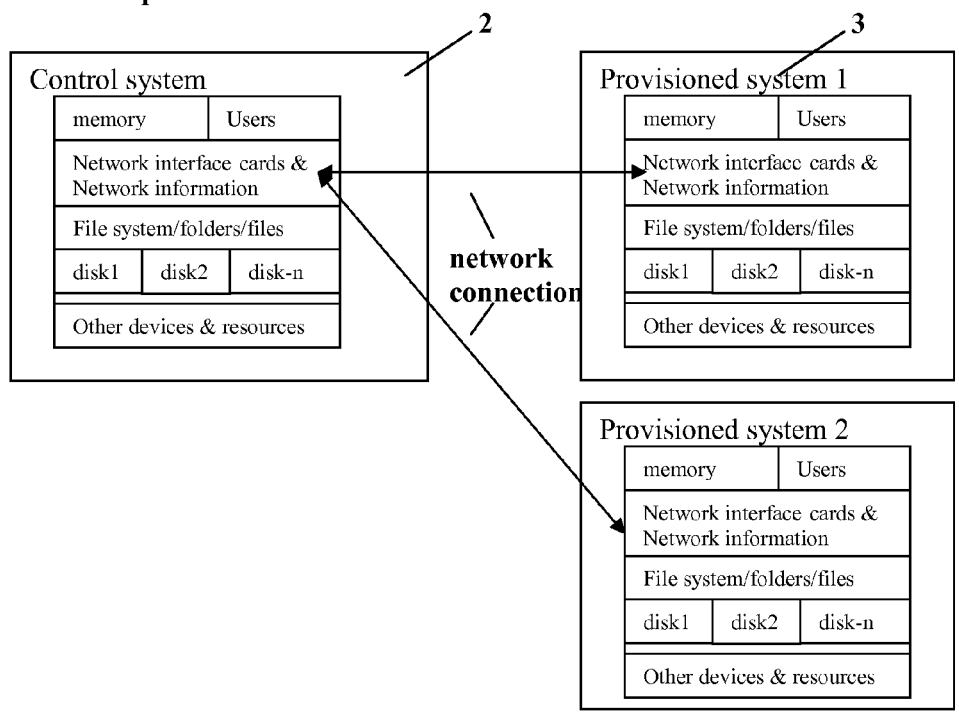
FIG. 5 illustrates an example of resources residing in computing systems in accordance with one embodiment of the present invention.

A web-based computer user work/operation environment ("WCUWE") of the CCDSVM is a software infrastructure, as illustrated in FIG. 3. The WCUWE provides each permitted user to log into the CCDSVM and further to provide each login user a private web-browser based user operating environment, which is a private work space including the assigned and permitted resources on the control system 2 or on the provisioned system 3 across a network. The WCUWE further provides each user from a single web-browser to perform various permitted tasks and operations over various system resources (as shown in FIG. 5), further, the tasks can be performed concurrently from a single login web-browser.

The mentioned tasks include allowing privileged users to create users, groups, assign users to each group, to assign initial associated system resources to each user or group, and to save the information of created users and groups into a database stored on a storage media of the control system. The information needed for creating users or groups include user names, user IDs, assigned security permissions, passwords, access points, group names, group IDs, maximum members in a group, and so forth. The tasks also include various system operations such as manage network, storage, file system, folder, files, messages, user security, and so forth.

The database is organized as one or more lists of tables, wherein each of the lists contains various resources. For example, the resources could be one or multiple users information, one or multiple systems information, one or more network cards, and one or more disk drives information. The storage media could be a system's internal storage or disk drive, for example.

The WCUWE of the CCDSVM includes the software modules of present invention. For example, the software includes the console support modules 6 of the control system 2, the service software modules 8 of the provisioned system 3, the other service software 13 of the console system 1. The current implementation of the WCUWE is based on a proprietary design of this invention. However, the nature and spirit of this invention does not limit to proprietary designed software. The WCUWE of the CCDSVM also includes other proprietary software modules or conventional software such as the web-server modules 7 of the control system 2, and the web-browser 9 of the control system 2, the client system 10, and console system 1.

The WCUWE of the CCDSVM can be implemented with any suitable or combination of various suitable programming languages such C, C++, Java, JavaScripts, HTML, XML, and so on. To simplify the discussion, the WCUWE will be used to represent software modules in the CCDSVM described above.

Users of the CCDSVM may be created by the CCDSVM though a given process. Also, any users on the Internet, Intranet, or LAN without registering with the CCDSVM may also access the CCDSVM. The WCUWE of the CCDSVM provides user to access various resources and perform various tasks, for example, through a preferred model of mouse clicking on graphically represented resource objects displayed in a web browser 9 screen.

The WCUWE is designed to be operated on a CCDSVM platform, and specially is designed to provide dynamic work space (FIG. 4A) to each user associated with various CCDSVM. The WCUWE further supports tasks of instantly posting or un-posting user's private resources information to peer members in a group or to each peer user of the CCDSVM not in a group or not in same group, or to massive public users on the network, where the massive public users may do not have accounts with the CCDSVM platform.

The dynamic work space of the WCUWE is a centrally controlled collection of each group's work space and/or user's private work space. The console support software 6 of the control system 2 of the CCDSVM will assign each user a private work space and each group a common work space when each user or group account is created by a privileged user after the corresponding WCUWE software modules configured in the control system 2 and in the provisioned system 3 enter into an operational mode. When a user or a group account is created, each user or group is assigned with specific security scopes and permissions. An important aspect of the WCUWE of the CCDSVM is that it assigns each user and/or each user-group a working space based on user and group security permission.

Figure 4A:
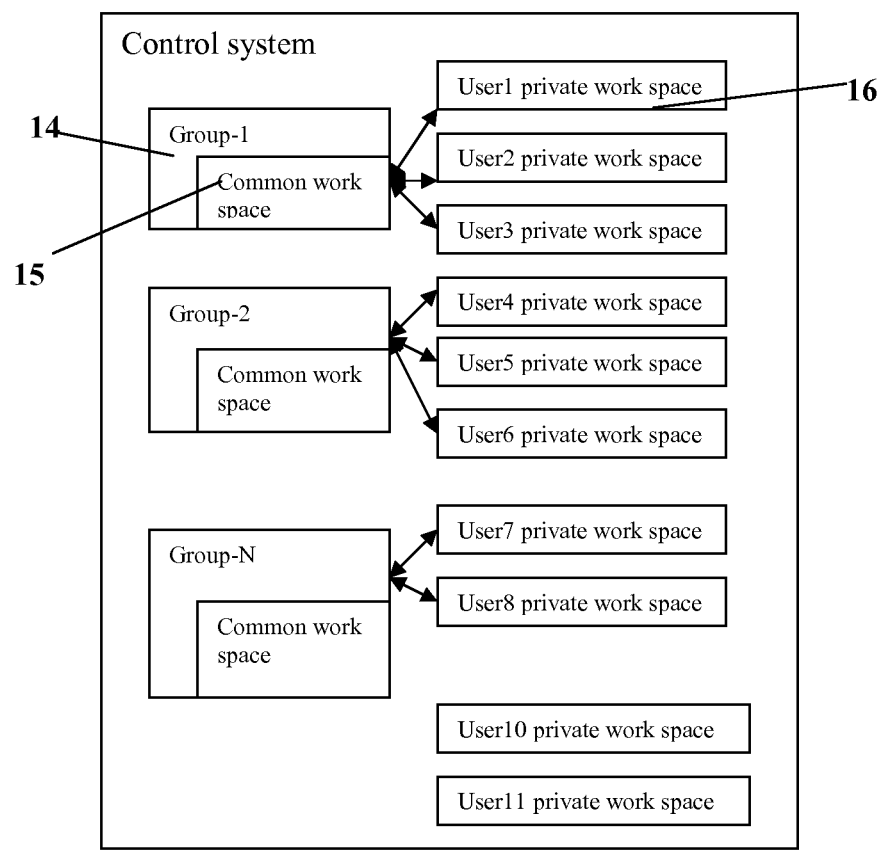
FIG. 4A illustrates an example of a dynamic work space in accordance with one embodiment of the present invention.
Figure 4B:
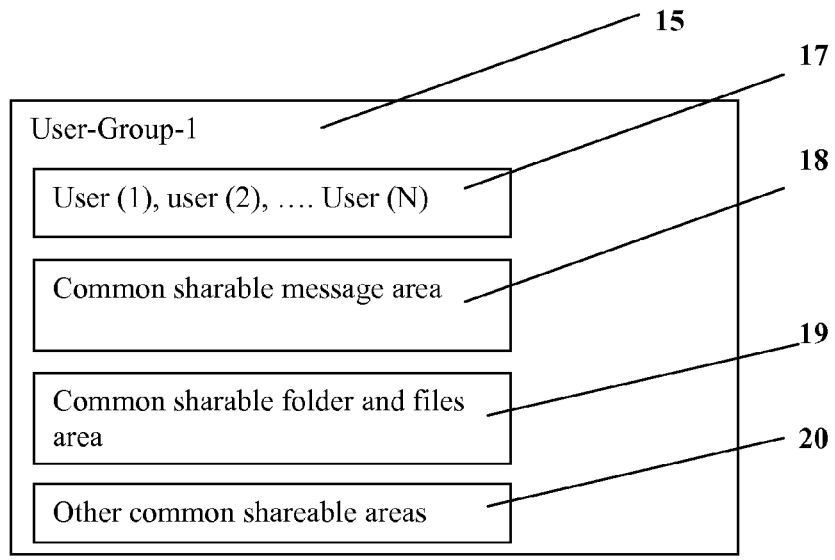
FIG. 4B illustrates an example of possible resources which may be assigned to a user-group common work space in accordance with one embodiment of the present invention.
Figure 4C:
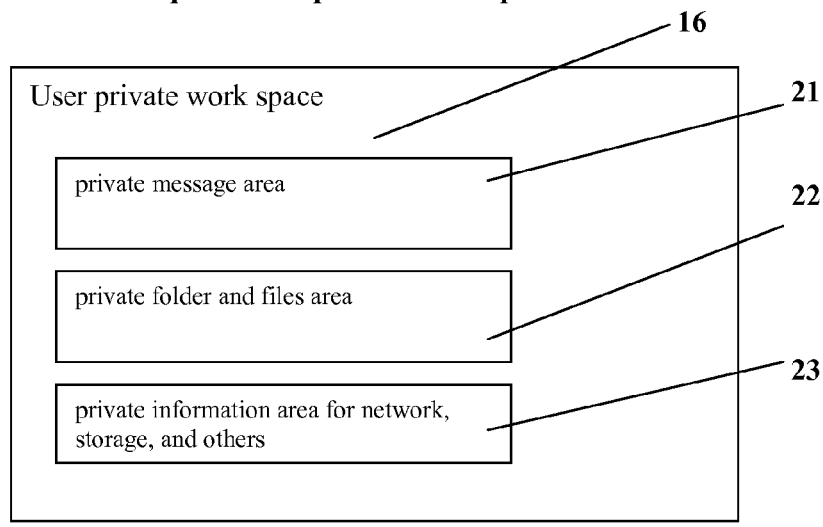
FIG. 4C illustrates an example of a user private work space and possible assigned system resources in accordance with one embodiment of the present invention.

A work space is an organized information structure, which can be saved in storage media of memory or disk drives or both of the memory and disk drives by the console support software modules 6. A work space is created during a privileged user performing the tasks of creating user or group. The work space will be initiated and assigned with system resources of the CCDSVM as shown in FIG. 5. Various system resources either in each provisioned system 3 and/or in a control system 2 include respective memory, system-groups, computing systems in a system-group, file systems, file folders, files, storage media, network media and so on without limits. The common work space 15, as shown in FIG. 4B for each group may be initially assigned with information of system resources (illustrated in FIG. 5) such as users in this group, messages, file systems, folders and files on a specific provisioned system 3 or on the control system 2, and so on without limits. The resources of the common work space may also be dynamically assigned or allocated by permitted user after creating group account. For example, during an online interactive meeting, a user posts a file to the common work space, so that a new entry of a file node is added to a file and folder tree area of the common work space. In addition, each group may be assigned with one or multiple users, wherein each user can also be assigned with a private work space 16 as shown in FIG. 4A and FIG. 4C during the user account creation. The private work space may also be initially assigned with system resources of the CCDSVM during the user account creation. Alternatively, the private work space is dynamically assigned with the resources of the CCDSVM after the user account being created.

For example, a privileged user can dynamically permit or deny a general user to access a list of storage devices. During the operation, at one second, a user may see the list of from the user's web-browser, and at another second, the user can no longer see the list of the storage devices. Also, if an authorized user is permitted access to a list of storage devices on a provisioned system 3, and the user further, can take one of the devices offline so that the list of the storage device configured in the provisioned system will have one less devices to be displayed.

In another example, at one second, a privileged user allows a general user to access a file J in a folder N on a system M of the CCDSVM, and at another second, the privileged user resets the previously granted permission, thereby, the general user can view and access the file J in the folder N on the system M of the CCDSVM at one time, and a second later, the general user can no longer view and access the file J. The actual implementation of the console support software 6 of control system 2 has achieved this capability.

In addition, each type of resources in the work space is organized as a list of tables and can be stored in storage media in the control system 2. The integrity of security of each group is protected by limiting different resources to different groups. As such, each group is authorized to have a limited view over assigned system resources residing in the provisioned system 3 as well as in the control system 2. The same security integrity at user level can be achieved by assigning different system resources of the provisioned system 3 and/or the control system 2 to different individual user based on assigned security permissions. Therefore, each user is authorized to access and view the assigned resources.

FIG. 4B has shown an example of assigned resources including users 17, message area 18, folders and files area 19, and others area 20 for other resources in the common work space 15 of a user group. The messages from each user in the user-group's common message area 18, and the information of the folders and files in the common files and folder area 19 can be shared by all users in the same user group. All resources in each group's common work space can be selectively displayed through the web-browser 9 on each login user's local system, who belongs to a same user group after the resources in said group work space being converted to presentable web-format (web-page) by the console support software 6 of the control system 2 of the CCDSVM.

FIG. 4C has shown an example of assigned resources in the private work space (16) for a user, which includes resources in private message area 21, private file and older area 22, and private network or storage information or other information area 23. The assigned resources only can be exclusively viewed and accessed by the designated user unless he/she agrees to share with peer user crossing group boundary or with peer user in same group. The folder (directory) is a data structure which can hold one more files and sub-folders at logical file system level and at physical level on storage media.

Figure 8A:
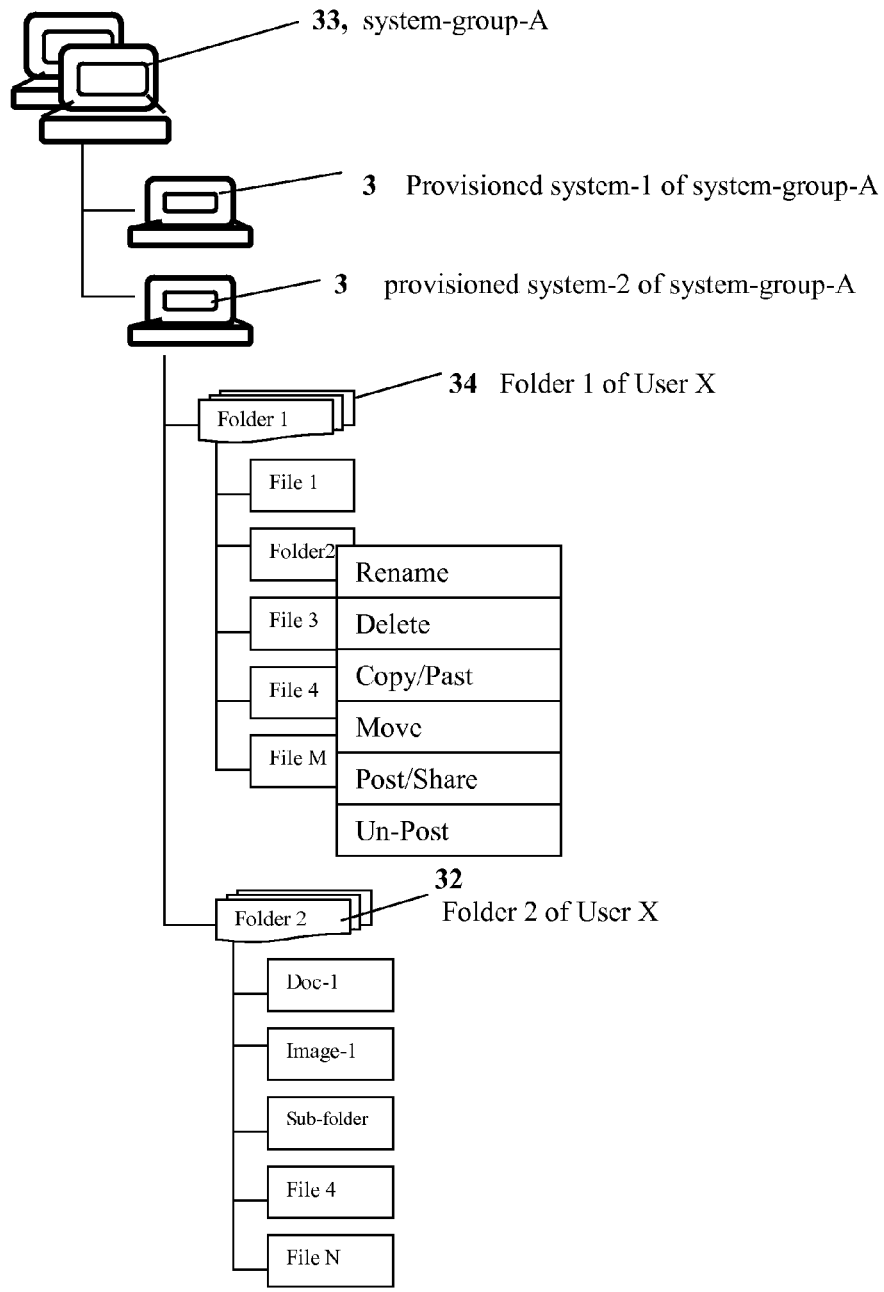
FIG. 8A is an example of a web-based graphic presentation of assigned resources in a user X's private work space in accordance with one embodiment of the present invention.

FIG. 8A has shown an example of displaying an actually implemented portion of a web-page encoded with assigned resources in the private work space 16 of an user X, which includes a system-group-A 33 on said network, multiple provisioned systems 3 under the system-group-A, private folders 32 and 34 of the user X resided on a system, and files under the folders 32 in a displayed private work space 16 of the user X.

Figure 8B:
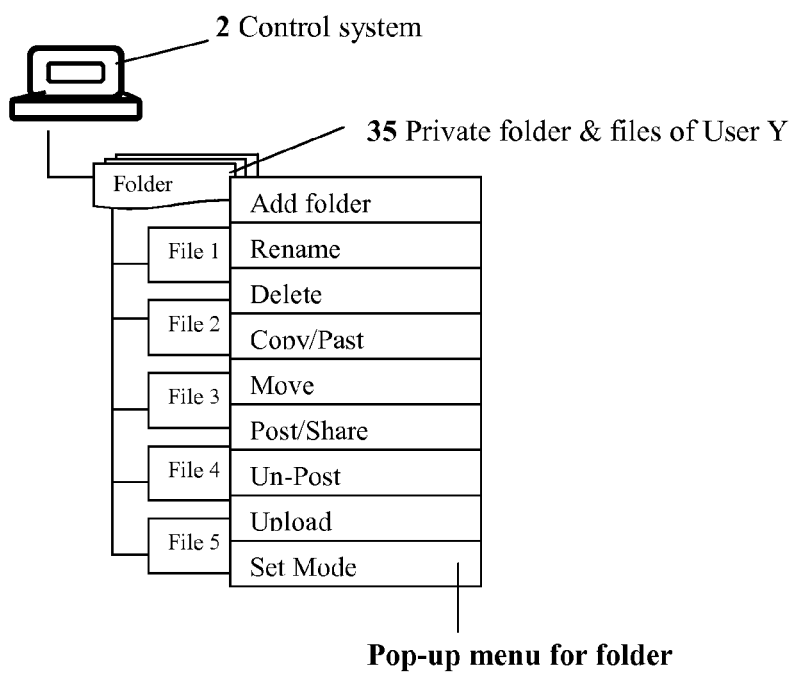
FIG. 8B is an example of a web-based graphic presentation of assigned resources in the private work space of an user Y in accordance with another embodiment of the present invention.

FIG. 8B has shown another example of displaying an actually implemented portion of a web-page encoded with assigned resources in the private work space 16 of an user Y, which includes a control system 2, private folder and files 35 that belong to the user Y in the private work space 16 of the user Y.

The private work spaces of user X and user Y may also include private message area 21 and other resources, which are not displayed in FIG. 8A & FIG. 8B because the WCUWE is designed to dynamically display part of each user's private work space 16 whenever there is needs.

It is notable that said user X and user Y, may be in same user-group such as said group-1. However, each of them could have a significant different scope of an assigned private work space 16 assigned by the console support software 6 of the control system 2 due to they have been assigned with very different resources on the systems depending on each user's roles and security permissions, which are setup by said privileged user of the CCDSVM through web-based user interfaces that are provided by the console support software 6.

The FIG. 6C and FIG. 6D are examples of web-page displaying in the web-browser 9 of the user X and user Y in a user-group-1 before an interactive online meeting. As shown in FIG. 6C and FIG. 6D, the user X or user Y or other users (who's web-page/browser did not depicted) in the same user-group-1 have entered a group online meeting after each one login to the CCDSVM from a web browser on any the user's local system across said network. Further, all users can get an identical web-page provided by the console support software 6 of the control system 2 except with different contents in the displayed private work space section of the web-page due to each user has been assigned with different resources. The web-page screen layout provided by said console support software 6 contains four sections:

1) a private user message input area (section-1), 2) a message displaying section for common message area 18 illustrated in FIG. 4B that all users in the user-group-1 (section-2) can access, 3) a file and/or folder display section for the group common file and folder area 19 illustrated in FIG. 4B that all users in the same user-group-1 (section-3) can access, and 4) a file and folder tree displaying and management section (section-4) for the folder and file tree in the private file and folder area 22 of a user's private work space illustrated in FIG. 4C.

Initially, section-1, section-2, and section-3 are all empty due to no one has posted any file or message yet. The console support software 6 obtains each login user's a portion of assigned folders and files for the online meeting from the private file and folder area 22 of the private work space 16 of each user which stored on said storage media as illustrated in FIG. 4C, and further converts said file or folder information into the presentable web-format (web-page) to be displayable in said section-4 of a web-page of the web-browser 9 on each user's local system. The choice of total four sections of the web-page layout and the order of each section on the browser screen is irrelevant to this invention since other choices are also possible, and further, this invention does not have limitation on what web-screen layout shall be. The information of file or folder includes the system name where the file or folder resided, the named and path of the file or folder, the owner of file or folder, the time stamps, the size of the file and so on without limitation.

During the interactive online meeting, the console support software modules 6 provides each user to post or un-post files or folders to said section-3 of displayed group's common documents and contents management section with several steps. First, for example, providing said user X to click on a targeted file "Doc 1" 24 or folder-1 a time in the section-4 of the displayed file and folder management area of the private work space 16. Second, select an operation of either post or un-post from an operation menu (see FIG. 9A, FIG. 9B, FIG. 10A and FIG. 10B). Finally click on the selected operation to submit the task of either post or un-post the selected file or folder.

Figure 6A:
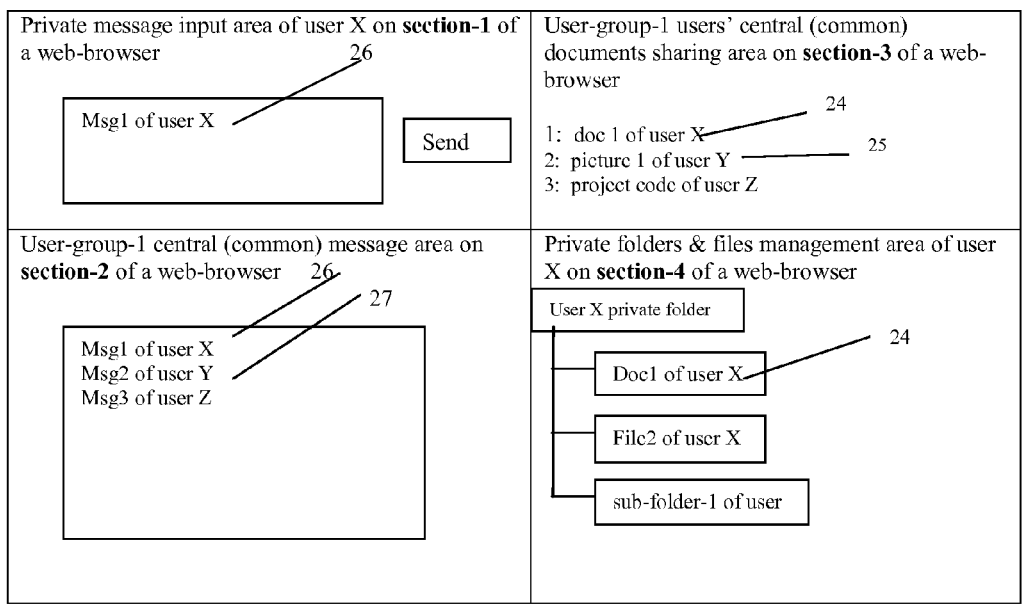
FIG. 6A illustrates an example of displaying a web-page with 4 sections via a web-browser of a user X in a user-group during an interactive online meeting in accordance with one embodiment of the present invention.
Figure 6B:
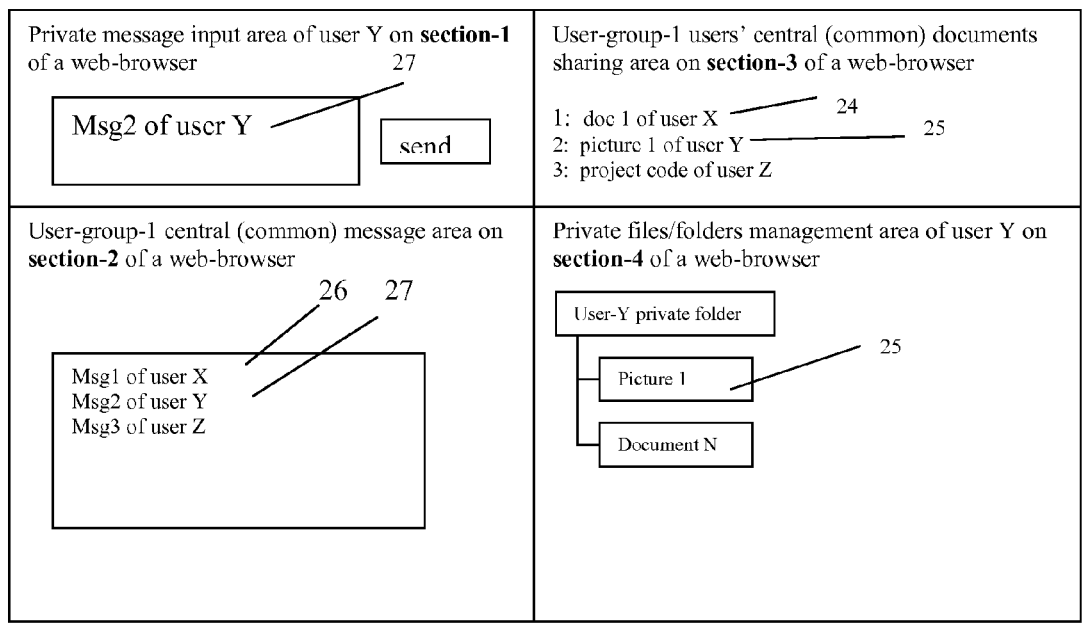
FIG. 6B illustrates an example of displaying a web-page with 4 sections via a web-browser of a user Y in a user-group-1 during an interactive online meeting in accordance with another embodiment of the present invention.

Each user with permission may perform un-post operation if such user has at least a previously posted file or folder, which has already displayed in the section-3 of the common document and content management section of the web-browser 9 for all login users of the same user-group, see FIG. 6A or FIG. 6B for example.

If a file is selected, said file operation menu is used and if a folder is selected, said folder operation menu is used respectively. It is also possible to only provide one menu for both file and folder operation by the console support software 6. The operation menu either can be pop-up menu for folder as shown in FIG. 9A or pop-up menu for file as shown in FIG. 9B, or non-pop-up menu for folder as shown in FIG. 10A or non-pop-up menu for file as shown in FIG. 10B. The choice of the operation menu is irrelevant to this invention although the actual implementation of this part of invention has used pop-up menu, and as matter of the facts that there is no limitation on how the operation menu is to be designed in this invention.

In the example of FIG. 6A, the user X can post a file named "Doc 1" 24 to said section-3 of the common document and contents display section displayed in each user's web-browser 9 screen. In the example of FIG. 6B, the user Y also can post a file named "picture 1" 25 to the same section-3 in said web-browser 9. In addition, another not depicted user Z posted a file of "project code". The files or folders posted could be the one physically located in the control system 2 or on any provisioned system 3 of the CCDSVM.

In addition, during the interactive online meeting, the console support software 6 of the control system 2 also provides each user to be able to post message to massive users in the same group via said section-1 of the private user message input section by typing a message and click on a "send" button. In the example of FIG. 6A, the user X posted a message of "Msg1 of user X" 26. In the example of FIG. 6B, the user Y also posted a message of "Msg2 of user Y" 27. In addition, another non depicted user posted a message of "Msg3 of user Z". As a result, all of three messages were displayed in the same said section-2 of each user's browser 9 screen.

In a specific situation, the console support software 6 also provides permitted user to un-post a previously posted message. Just for example, as illustrated in FIG. 6A, said console support software 6 provides the permitted user X to select a previously posted "Msg2 of user Y" 27 from said section-2 of the common message display section of said web-browser 9 screen of the user X, and select un-post operation from said operation menu and submit the selected un-post task.

The detailed information of how the post or un-post task to be implemented will be discussed in next two paragraphs. In addition, with this invention, the action of the "post" information such as posting information of files or folders or messages or other resources is equivalent to the action of "share" information. The action of "un-post" information is equivalent to the action of "un-share" previously posted or shared information, in other words, to "remove" the previously posted or shared information.

After a user submitting information of the post or un-post task via the web-browser 9 of a console system 1 or a client system 10 or the control system 2 to the control system 2, the console support software 6 of the control system 2 obtains and parses the information to determine: who is the original user initiating the task; what is the type of the task; what is the type of the associated resources for task to work on; who is the targeted user; and what is the time stamp, and may also include other information without limitation. The console support software 6 further determines that if the task is to post a file or folder from said original user, the console support software 6 picks up the corresponding file or folder information that from the file and folder area 22 of private work space 16 of the original user as illustrated in FIG. 4C and deposits such information to the file and folder area 19 of the common work space 15 of said group as illustrated in FIG. 4B in this case.

If the task is to un-post a previously posted file or folder, which is posted from a specific user, in said common work space of said group, the said console support software 6 search for the corresponding information of file or folder, in the file folder area 19 of said common work space 15 of said group after it is found.

If the task is to post a message to users in the group, the parsed message will be stored into the private message area 21 of the original user's private work space 16 and also is copied to message area 18 of the common work space 15 of said user group by the console support software 6.

If a task is to un-post (delete/remove) a previously posted message, the console support software 6 searches for a matching message in the common message area 18 of said common work space 15 illustrated in FIG. 4B of said user group and remove such message entry if it is found based on the message and the original user's identification and other associated information such as time stamp, security permission and so on without limitation.

It shall be noticed that the task of un-posting a file or folder of this invention does not actually delete the file and folder from original user's private work space 16. In addition, a lock protection mechanism is deployed whenever a message or information of a file or folder is written, stored, or deposited to either said private space 16 or said common work space 15, or to said disk drives or other storage media. Throughout the rest of discuss, the lock protection is assume to be a default action without further mentioning whenever a write/store/deposit action take place. As matter the fact, each task of posting file, folder, and message as well as task of un-posting the previously posted file or folder, or message performed by multiple users in multiple groups with this invention can be executed by the console support software 6 instantly with memory speed.

FIG. 6A and FIG. 6B illustrate that after the console support software 6 of the control system 2 successfully executing the tasks for each user in each group, any user in a user-group can get a fresh view of said section-2 of the common messages display area of the user-group-1, and a fresh view of said section-3 of the common documents & contents display area of the user-group-1 through each user's web-browser 9 on the client system 10 or on the control system 2 or on the console system 1.

The user can manually click on a refresh-button, which does not show in the FIG. 6A and FIG. 6B, to refresh the corresponding part of browser screen for either said section-2 or section-3. Also said corresponding part of browser screen for said section-2 or section-3 can be automatically refreshed. As mater of the fact, optionally, the console support software 6 has encoded a run-time script in a web-page, which is encoded with said presentable web-format and to be displayed in the web-browser 9 screen after each user log on to the CCDSVM and start said group online meeting.

Thereafter the run-time script will automatically and periodically perform the tasks of refreshing said section-2 and section-3 of the web browser 9 screen. The frequency of the periodic refreshing can be adjusted by said console support software 6 of the CCDSVM depends on the needs of the meeting, which typically can range from 1 to 3 seconds and there is no limitation on this aspect. Also, with the preferred example, said run-time script provided by the WCUWE is a JavaScript, however, other type of programming scripts or methods are also possible and there is no limitation on what kind of run-time program shall be used in this invention. In addition, the console support software 6 can provide each user the choices of either automatic or manual refreshing said web-browser 9 screen.

Upon the task of refreshing the section-2 or section-3 in said web-browser 9 screen is performed for each user, a request of updating such screen window will be generated and sent from said web-browser 9 to the control system 2. The console support software 6 obtains and parses each request to determine what user group, and which part of said common work space 15 of said user-group need to be updated.

Based on the information of each parsed request, the console support software 6 of the control system 2 retrieves the updated resources and objectives from said common work space 15 of said user-group, which includes recent posted files, folders, or messages from each user in the user group, and in another embodiment which includes the updated list of files and folders or messages after un-post one or more files or folders, or messages by users in the group. Finally, the console support software 6 of the control system 2 converts retrieved information of the resources and objects to the presentable web-format (web-page).

If the request is to update the group messages, the converted information is displayed in the section-2 of the group common message display area, via the corresponding web-page in the web browser 9. If the request is to update the group common files and folders display area, the converted information is displayed the section-3 of said web-browser 9 screen through the web page. Therefore, after refreshing said section-2 and section-3 in said web-browser 9 screen, each user can have an identical view of all posted files and folders in the section-3 of the group common document display area of said browser 9 screen, and can have an identical view of all messages in the section-2 of group common message display area in said web-browser 9 screen, which posted by all other users in the user-group. Meanwhile said console support software 6 still allow each user kept most of resources and objects in their own private work space 16 un-exposed to other users in the group during the online interactive meeting.

For example, as illustrated in of FIG. 6A, the user X at his/her web-browser 9 can see "picture 1" 25 posted by the user Y in the group common file and folder display area but can not see other information in the user Y's private work space 16 area, and plus can see the "Doc 1" posted by the user X himself. Also, as illustrated in of FIG. 6B, the user Y at his/her web-browser 9 can see "Doc 1" 24 posted by the user X in the group common file and folder display area but can not see other information in the user X's private file and folder display area in the user X's private workspace 16, and plus can see the "picture 1" posted by the user Y himself.

A difference between a conventional Internet group communication model and the group based communication model described in the present invention is that the console support software 6 of the control system 2 provides each user to control post or un-post said resources from user's own private work space while the conventional Internet communication model are not capable of performing posting/un-posting task. For example, un-posting a previous posted folder with the WCUWE of the CCDSVM does not delete the materials in user's private work space 16 while the delete operation with said existing Internet group communication model will completely delete a shared file or folder. The dynamic work space of this invention provides combined security protection for information and flexibility and efficiency for users and groups of users to have the online meeting within the WCUWE of the CCDSVM environment.

In addition, with a preferred example, since the posted information of each files are encoded by said console support software 6 with a web link and displayed in the section-3 of the web-browser 9 screen, therefore, each user in a user-group can click on said link to download the posted file, which provided in the private file and folder area of the private work space 16 of their peer users in the user-group, from a system where file is actually located. For example, the user X can download said "picture 1" posted by the user Y, where the "picture 1" may reside either on the control system 2 or on any provisioned system 3,; and the user Y can also download said "Doc 1" posted by the user X, where the "Doc 1" may also reside either on the control system 2 or on any provisioned system 3. This achieves a true peer-to-peer exchanging files resided on permitted systems between permitted users in a same user group. In addition, there is no size limitation on the file size for file to be downloaded, which is a gifted benefit from Internet technology. Besides the exampled and understandable method of download, other methods of retrieve peer users' digital documents or contents are also possible by deploying a more efficient proprietary file transfer mechanism to achieve the same results of said exchanging file. It shall be noted that the said method of download is only applicable to said files and does not apply to folder and other said resource information. To obtain a targeted peer user's entire folder and the underneath files and sub folders, a special files and folder transfer method is required.

As shown in FIG. 9A & 9B, and FIG. 10A & 10B, the console support software 6 of the control system 2 also provide each user to perform many other tasks during online meeting through said operation menu such as upload, rename, delete, copy/paste and so on without limitation. The upload operation allows each user to dynamically upload files one a time through the web-browser 9 from the local storage of the client system 10 or console system 1 into said user's private work space on the control system 2 during the meeting, and further to be posted into said common work space of an user-group which each user belong to.

The mouse click driven copy/past operation allows the files and folders from the permitted folders of the permitted provisioned system 3 to be dynamically and physically copied to each users' private work spaces on the control system 2, and the information of said files and folders could further to be displayed via said web-page in the web browser 9 screen on each user's local system and to be further posted into the common work space 15 of the user-group that each user belongs in addition to directly posting these files or folders on the provisional systems as described in previous paragraph without physically copying over. As matter of the fact, operations provided by the console support software 6 of the control system 2 have added efficiency to posting or un-posting files and folders for each user depending on the real needs.

Additionally, the console support software 6 provides each user of each user group with capability of saving the posted messages in the common message area 18 of said common work space 15 of said each group into a file in the common file & folder area of said common work space 15 of the group. Further, the saved file can be viewed, and downloaded by each user in the group after using the method of posting. Besides whenever there is needs, the console support software modules 6 provide users to reset message area to be empty by removing all message entries in the message area of said group's common work space 15.

The important fact is that the designed WCUWE of the CCDSVM has provided concurrent users each from a single web browser on the user's local system anywhere on the network to securely perform permitted various tasks, which could be run concurrent within a single web-browser. Because of the console support software modules 6 of the control system 2 provides each users have exclusive view for resource objects in their private work space 16 and in said common work space 15 of a user-group which each user belongs to, and provides each user to manage resource objects through their own private space, the multiple users in multiple groups can concurrently post or un-post files, folders, messages, or other resource objects without interfere users in other user-groups. Thus, the work spaces of each user and each group are well protected.

Hence, the console support software modules 6 of a control system 2 provides privileged users to perform tasks of creating multiple users and user-groups on the control system, and each group can be assigned with variable size of users for online interactive meeting. The total number of the users and the total number of the user groups, and maximum number of the users and the total number of the user-groups, and the maximum number of the users per groups that the WCUWE of the CCDSVM can support is an implementation issue and depends on the capacity of the control system 2. The WCUWE of the CCDSVM and CCDSVM has been designed with unlimited scalability for both users and provisioned systems 3. On the other hand, the spirit of this invention does not limit to with the boundary issues of the WCUWE and the CCDSVM.

FIG. 8A and FIG. 8B illustrate that each user-X and user-Y has a different private work space 16, and each user has assigned with different system resources. Without joining any group or participating any group meeting, the console support software 6 of the control system 2 can also provide user X and user Y to have peer-to-peer model for instantly posting files or folders one a time to each other, or instantly un-post the previous posted files or folders through similar steps as the posting or un-posting materials in group online meeting model as follow:

1) provide each user able to select, via clicking on a source of file or folder for post or un-post;

2) provide the user to selecting a post operation task if user want to post any selected file or folder through operation menu; or provide user selecting un-post a previously posted file or folder;

3) upon submitting the operation task, let each user to provide input to a prompt of "who is a targeted user?" which provided by said console support software 6, and further submit the selected operation task;

4) the console support software 6 obtains and parses task information including of the original user, the source of file or folder, type of operation, and other information;

5) If said type of operation is to post a file or folder, said console support software 6 to deposit the information of said source file or folder to said private file and folder area of said private work space 16 of a targeted user. If said operation type is un-post a file or folder, said console support software 6 search a corresponding file or folder information from said private file and folder area of said private work space 16 of said targeted user to find if it matches the source file or folder, if a match is found, the corresponding entry of the file or folder is removed from said private file and folder area of said private work space of the targeted user; and 6) Upon the target user refreshing the web-page displayed in the web-browser 9 screen, the console support software 6 retrieves and converts the updated information in said private file and folder area of the private work space 16 of the targeted user into a presentable web-format (web-page) and causes display of said web-page in the web-browser 9 screen for viewing.

Figure 8C:
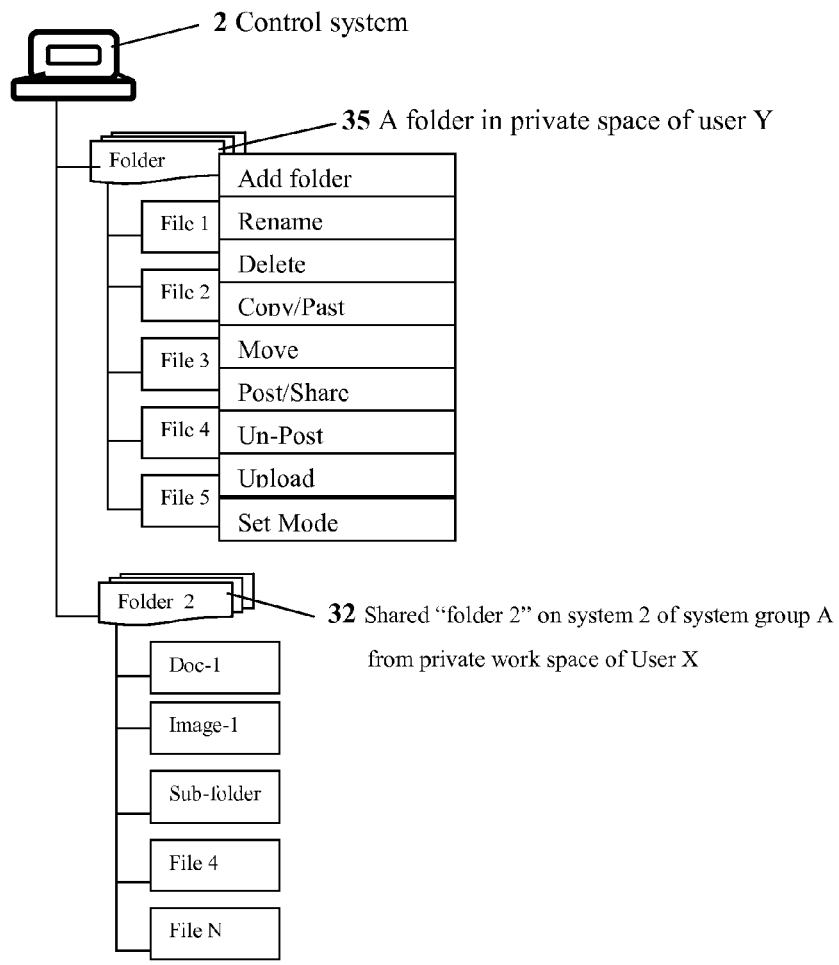
FIG. 8C is an example of a web-based graphic presentation of user Y's private work space after the user X dynamically posted and shared a "folder 2" in the user X's private space in accordance with another embodiment of the present invention.

For example, as shown in FIG. 8A, the user X from a web browser 9 can follow said steps 1) to 3) to post his "folder 2" 32 in the displayed files and folders area of the private working space 16 in the user X's web-browser 9 screen to into the user Y's user interface such as shown in FIG. 8B; upon the user Y refreshing his/her web-browser 9 screen on the user Y's local system by walking over any system node or folder node in the displayed resource tree, the user Y will see said "folder 2" 32 in his/her displayed private file and folder tree in the private work space 16 of the user Y such as shown in FIG. 8C. As matter of the fact, when walking over a system node, or file & folder tree displayed in said web-browser 9 screen, a request of refreshing web-page screen is generated and to be handled as described in the steps described above.

In addition to post messages in the group based communication involving parties with two or more users, the WCUWE of the CCDSVM also provide each user to post message to each other user in non-group based 1-to-1 personal model. The FIG. 7A and FIG. 7B have shown an example of the user X and user Y, who may not be in a same user-group, however, the console support software 6 of the control system 2 provides each user to share and exchange messages with each other through a three-section web-page being displayed in said web browser 9 screen.

The section-3 of the web-page in said browser 9 let each user to work with same steps of non-group based 1-to-1 posting files and folders or un-posting previously posted files or folders as described previously. The section-3 included in FIGS. 7A and 7B just for a demonstration of how flexible of this invention is for displaying information in the private work space 16 of each user. Further, the number of sections in the screen layout and the order of each section in the web-page display really is not a limitation to this invention.

The section-1 is an user message input area together with an additional input field of "To who" due to unlike in group online meeting, the console support software modules 6 have no knowledge of who is the targeted user in this case. Thus, a user can posting a message with similar steps as previously discussed previously in this invention. Nevertheless, unlike with group meeting messaging model, after obtaining and parsing information of the messages from each user, the console support software 6 of the control system 2 will deposit the message to both targeted peer user and the original user's message areas of the private work space 16. Further, with same steps that described previously for displaying messages in each user's browser 9 screen each user can view both own message and messages from peer user in section-2 of the browser 9 screen.

Figure 7A:
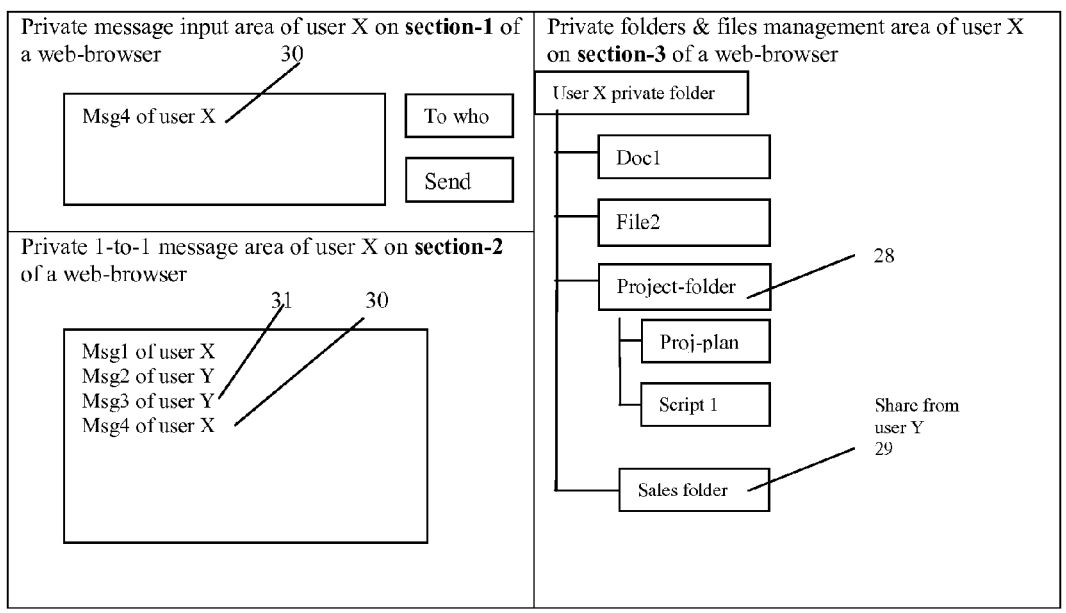
FIG. 7A illustrates one-to-one (peer-to-peer) post or un-post messages, files and folders by an user X in accordance with one embodiment of the present invention.
Figure 7B:
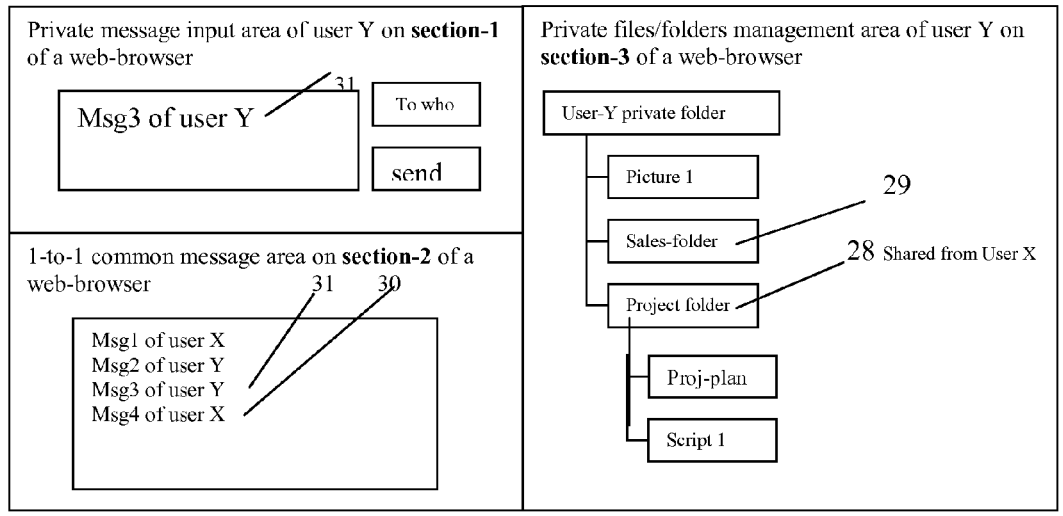
FIG. 7B illustrates one-to-one (peer-to-peer) post or un-post messages, files and folders by an user Y in accordance with another embodiment of the present invention.

For example, as shown in FIG. 7A, the user X input a message of "msg4 of user X" 30 and type "user Y" in input field of "To who", and then submit the message by clicking on "Send" button. Similar as shown in FIG. 7B, the user Y can input a message of "Msg3 of user Y" 31, and type "user X" in input field of "To who", and then submit the message. Upon the refreshing a web-page in the web-browser 9 screen of each user, the user X will see the message 30 he/she sent and the message 31 from the user Y. Also the user Y will see both messages 30 and 31 at the same time.

Again, the design choice of three sections of the web-page display layout and the order of each section is just a preferred example of implementation for non-group based peer user communication. This invention does not limited by web-screen display layout, for example, a screen display only with said section-1 and section-2 are also possible and so on without limitation.

The WCUWE of the CCDSVM has provided a security hierarchy for members of any team to work together cross multiple locations. With said security hierarchy and said steps of posting or un-posting message, file and folder, the console support software 6 of the control system 2 can let only a team leader with capability of posting folder or file to be viewed, shared, by all team members or by an individual member in a non-group meeting based environment. In addition, the console support software 6 also provides each team member to post or un-post his/her files or folders to only a specific peer user one a time in non-group-meeting based environment. Again the said files or folders could be residing in said control system 2 or in any provisioned system 3.

It is relatively straightforward for the WCUWE of the CCDSVM, more specifically the console support software modules 6, to support massive online users, who do not have account with the CCDSVM and can not login the CCDSVM, yet to view the dynamically posted files, folders, or messages posted by the users with user account registered with the CCDSVM.

Figure 6E:
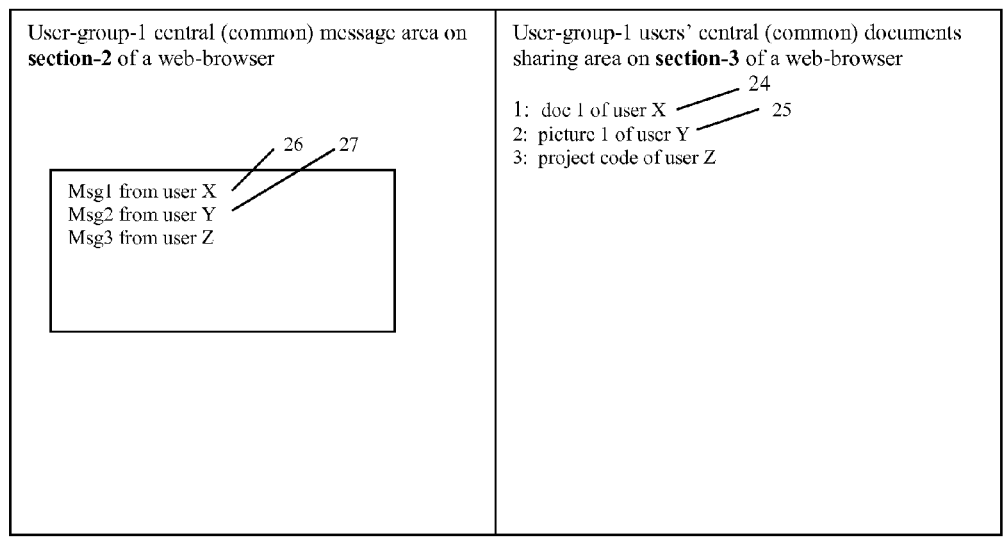
FIG. 6E illustrates an example of a displayed web-page that each of a plurality of massive online users can access and view from each of their browser screens without login to the CCDSVM during said user X and user Y in the user-group-1 online meeting in accordance with another embodiment of the present invention.

In a preferred example, such as shown in FIG. 6E, the console support software 6 of the control system 2 provides a web-page to massive online users, who do not have to login the CCDSVM. The web-page could be layout with two major sections with section-1 for display of messages in the sharable message area of a group's common work space 15 while the section-2 for display of files or folders in the sharable file or folder area in said group's common work space 15.

For users belong to same said group, each user from a web-browser 9 screen displayed on the user's local system is able across said network to login to the CCDSVM and obtain the group online meeting web-page as shown in FIG. 6A for the user X and in FIG. 6B for the user Y. Further as described previously, each user in said user group can instantly post message to said message area 18 of said group's common work space 15, or post file or folder to the sharable file and folder area in the group's common work space 15. Also, each user in the group can instantly un-post the previously posted files or folders by removing the corresponding file or folder entry in the file and folder area of the group's common work space 15, or un-post the previously posted messages from the common message area of the common work space 15 of said group as described in previous.

Meanwhile as previously described and as shown in FIG. 6E, said web-page for said massive online users, who have no account with CCDSVM, can be dynamically updated, displayed, and viewed by said massive users anywhere through their own web browser accordingly with the same pace as dynamically displaying in said section-2 and section-3 via a web-page in the web browser 9 screen as shown in FIG. 6A and FIG. 6B. Again, said two sections of the web-page display layout for said massive users is a preferred example and it does not limit this invention because with this invention other layout is also possible, for example, it may be desired to have web-page layout only contains one section, which is either for messages or file or folder's display depending on the application's need.

As shown in FIG. 8A, FIG. 8B, and FIG. 8C, with non-group based peer-to-peer post or un-post files and folders model, people may often do not remember how many files and folders have been posted for sharing. For example, as shown in FIG. 8A, the user X can select "folder 2" 32, then select a post operation from an operation menu, and provide a target "user Y" to share the "folder 2" 32 with the user Y. As show in FIG. 8C, the user Y can see "Folder 2" 32 posted by the user X in the web-browser 9 screen of the user Y after the user X posted "Folder 2" 32. If the user X selects and posts various files or folders to other dozen people for share, the user X will have difficult time to remember what has been shared and who are targeted users. As shown in FIG. 11, the console support software modules 6 of the control system 2 can provide each user, the user X for example, a summarized view of a sharing list of how many files or folders being posted by the user X and shared with which user.

As shown in FIG. 11 for the personal share management, in the user X's web-browser 9 screen, an entry of posted "Folder 2" 32 is listed at bottom of said sharing list and it is posted to and shared with the user Y. Further, said console support software 6 can provide each user selectively un-post the previously posted files and folders by clicking on the "delete shared?" of an operation menu for a corresponding entries in the displayed share list and further to generate an un-post operation task. For example, the user X clicks on "delete share?" to un-post "Folder 2" 32. Thereafter, as described before said console support software 6 of the control system 2 will execute the un-post task. Further upon refreshing the targeted user Y's web-page in the web-browser 9, in stead of seeing "Folder 2" 32 as shown in FIG. 8C, the user Y will see an updated display of folders via an updated web-page as shown in FIG. 8B, where the "Folder 2" 32 has been removed. The operation menu for "delete share?" depicted here just for example and it could be displayed in any other form.

In addition to let original user in a user group to control the un-posting file or folder in the group based communication, the console support software 6 of the control system2) may also provide a privileged user to un-post the previously posted files or files in said displayed file and folder section of a web-page. To support this capability, the console support software 6 will provide an operation menu to associate with said displayed files and folders in said display section, further to allow privileged user to perform similar un-post operation. After receiving the un-post operation, the console support software 6 will perform similar said searching for selected file or folder in the group file and folder area 19 of the group common work space 15 of said group, if there is a match, the corresponding entry will be deleted. Also, the file and folder section of the web-page in the web-browser 9 can be refreshed accordingly as described before.

Figure 12:
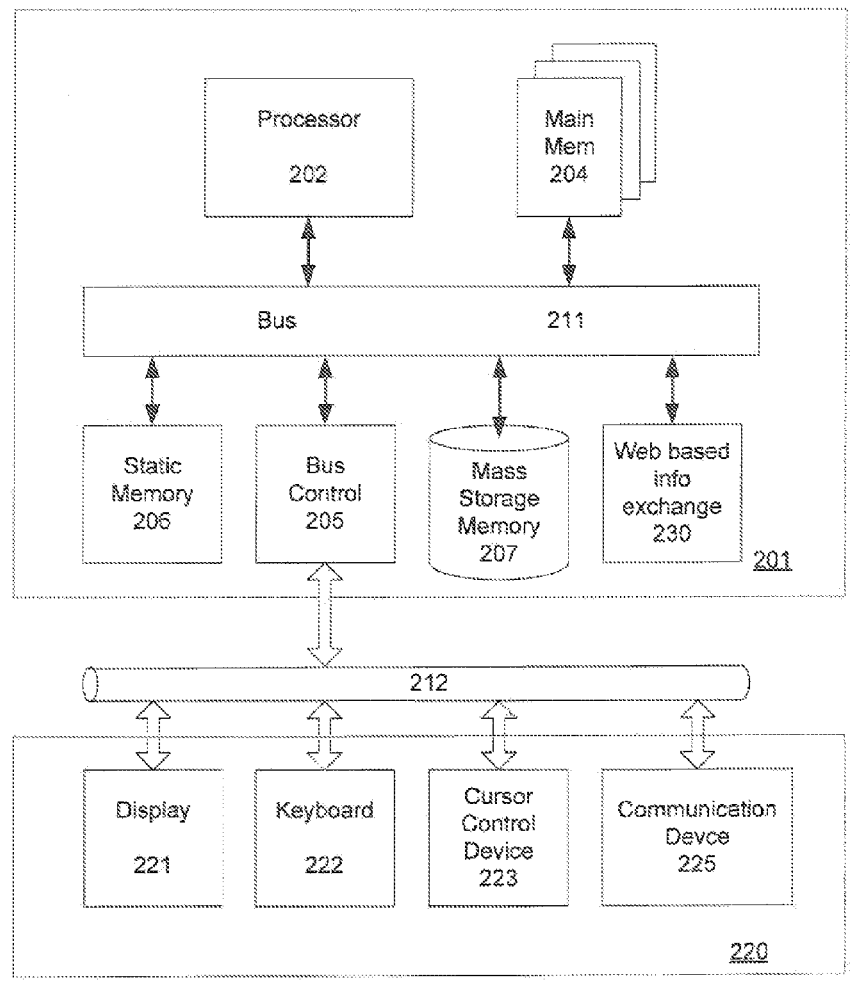

Having briefly described embodiments of the web based network environment in which the present invention operates, FIG. 12 illustrates an example of a computer system 200, which is an exemplary client system 10, provisioned system 3, control system 2, or console system 1 in which the features of the present invention may be implemented. Process of the web based information exchange can be implemented in any processor-based computer system, such as a PC, a workstation, or a mainframe computer. It will be apparent to those of ordinary skill in the art that other alternative computer system architectures may also be employed.

Referring back to FIG. 12, computer system 200 includes a processing unit 201, an interface bus 211, and an input/output ("IO") unit 220. Processing unit 201 includes a processor 202, a main memory 204, a system bus 211, a static memory device 206, a bus control unit 205, a mass storage memory 207, and a web information exchange module 230. Bus 211 is used to transmit information between various components and processor 202 for data processing. Processor 202 may be any of a wide variety of general-purpose processors or microprocessors such as Pentium™ microprocessor, Motorola™ 68040, or Power PC™ microprocessor.

Main memory 204, which may include multiple levels of cache memories, stores frequently used data and instructions. Main memory 204 may be RAM (random access memory), MRAM (magnetic RAM), or flash memory. Static memory 206 may be a ROM (read-only memory), which is coupled to bus 211, for storing static information and/or instructions. Bus control unit 205 is coupled to buses 211-212 and controls which component, such as main memory 204 or processor 202, can use the bus. Bus control unit 205 manages the communications between bus 211 and bus 212. Mass storage memory 207, which may be a magnetic disk, an optical disk, hard disk drive, floppy disk, CD-ROM, and/or flash memories for storing large amounts of data. The web based information exchange 230, in one embodiment, is a network control component for facilitating information exchange over the Web. It should be noted that web based information exchange 230 could be software or hardware or a combination of software and hardware components.

I/O unit 220, in one embodiment, includes a display 221, keyboard 222, cursor control device 223, and communication device 225. Display device 221 may be a liquid crystal device, cathode ray tube ("CRT"), touch-screen display, or other suitable display device. Display 221 projects or displays images of a graphical planning board. Keyboard 222 may be a conventional alphanumeric input device for communicating information between computer system 200 and computer operator(s). Another type of user input device is cursor control device 223, such as a conventional mouse, touch mouse, trackball, or other type of cursor for communicating information between system 200 and user(s).

Communication device 225 is coupled to bus 211 for accessing information from remote computers or servers, such as server or other computers as illustrated in FIG. 1, through network 11 or 12 as illustrated in FIG. 1. Communication device 225 may include a modem or a network interface device, or other similar devices that facilitate communication between computer 200 and the network. Computer system 200 may be coupled to a number of servers via a network infrastructure such as the infrastructure illustrated in FIG. 1.

The present invention has been described in considerable details with reference to certain examples. However, other versions and examples are also possible, therefore, the spirit of this invention shall not be limited to these examples and/or embodiments. Also, the claims of this invention will label with numbering and in most cases, the numbering does not represent any sequence or order unless specifically described as the steps of a method.

The invention claimed is:

1. A method for supporting virtual presentation between a plurality of users in a collaboration system, the method comprising:
    displaying a first user interface comprising metadata of files and folders, residing in a server or in at least one computing device, on a first end-user device to allow a first user to select one selected file or one selected folder from the metadata displayed and request metadata of the selected file or folder to be posted to a second interface;
    causing the server to store the metadata information, but not content, of the selected file or the selected folder according to the request for the posting received from the first end-user device; and
    displaying to a second user the stored metadata of the selected file or the selected folder including to display a graphic indicator of the selected file or folder in the second user interface on a second end-user device to allow the second users access to the content of the selected file or folder through the stored metadata displayed in the second end-user interface.

2. The method as recited in claim 1, wherein the stored metadata of the selected file or folder is stored in a file and folder section in a workspace configured in a storage medium, the workspace accessible by the second user and comprising a plurality of section.

3. The method as recited in claim 1, wherein the metadata of the files and folders at least comprises name, path, owner, or timestamps of each of the files and folders.

4. The method as recited in claim 1 further comprising:
    configuring a message section in the first user interface to allow the first user to input a message thereto and request the message to be posted to the second user interface;
    causing the server to store the message according to the request for posting the message received from the first end-user device; and
    displaying to the second user the stored message in the second user interface on the second end-user device for the second user access to the message.

5. The method as recited in claim 4, wherein the message is stored in a message section in a workspace configured in a storage medium accessible to the second user, the message including predetermined information in addition to content of the message.

6. The method as recited in claim 4, further comprising:
    allowing the first user via the first user interface to request removing the displayed message; or information of the selected file or folder from the second user interface;
    causing the server to delete the stored message or metadata information of the selected file or folder according to the request for the removing received from the first end-user device; and
    displaying to the second user the second user interface, without including the deleted previously stored message or information of the selected file or folder, on the second end-user device.

7. The method as recited in claim 1, further comprising:
    wherein the first end-user device and the computing device are the same device or different devices separate across a network;
    wherein the second user device and the computing device are the same device or different devices separate across a network.

8. The method as recited in claim 1, further comprising:
    wherein the first end-user device and the server are the same device or different devices separate across a network;

wherein the second end-user device and the server are the same device or different device separate across a network.

9. A server in a collaboration system supporting virtual presentation between a plurality of users, the server comprising:
   at least one hardware processor, and
   program code which, when executed by the at least one hardware processor, causes the server to:
      display a first user interface comprising metadata of files and folders, residing in the server or in at least one computing device, on a first end-user device to allow a first user selecting one selected file or one selected folder from the metadata displayed and requesting the metadata of the selected file or folder to be posted to a second user interface;
      store the metadata information, but not content, of the selected file or the selected folder according to the request for the posting received from the first end-user device; and
      display to a second user the stored metadata of the selected file or the selected folder including to display a graphic indicator of the selected file or folder in the second user interface on a second end-user device to allow the second user access to the content of the selected file or selected folder through the stored metadata displayed in the second user interface.

10. The server as recited in claim 9, wherein the stored metadata of the selected file or the selected folder is stored in a file and folder section in a work space configured in a storage medium, the workspace accessible by the second user and comprising a plurality of sections.

11. The server as recited in claim 9, wherein the metadata of the files and folders are collected by the server locally and/or collected automatically from the computing device across a network which is one of a corporate intranet, the Internet, a local area network or a wide area network.

12. The server as recited in claim 9, wherein the program code causes the server further to:
   configure a message section in the first user interface to allow the first user to input a message thereto and request the message to be posted on the second user interface;
   store the message according to the request for posting the message received from the first end-user device; and
   display to the second user the stored message in the second user interface on the second end-user device for the second user access to the message.

13. The server as recited in claim 12, wherein the program code further configures the server to:
   allow the first user via the first user interface to request removing the displayed message or information of the selected file or the selected folder from the second user interface;
   delete the stored message or the stored metadata of the selected file or the selected folder according to the request for the removing received from the first end-user device; and
   display to the second user the second user interface, without including the deleted previously stored message or metadata of the selected file or folder, on the second end-user device.

14. The server as recited in claim 12, wherein the message is stored in a message section in a workspace configured in a storage medium and accessible to the second user, the message including predetermined information in addition to content of the message.

15. The server as recited in claim 9, wherein the metadata of the files and folders at least comprises name, path, owner, or timestamp of each of the files and folders.

16. The server as recited in claim 9, wherein the program code further causes the server to:
   allow the first user to present a message, file information or folder information to a third user on a third end-user computing device; and
      allow each of the second and third users to present a message, file information or folder information to the first user.

17. A collaboration system supporting virtual presentation between a plurality of users, the collaboration system comprising:
   a server; and
   at least one computing device coupled to the server across a network,
   wherein the server is configured to:
      display a first user interface comprising metadata of files and folders, residing in the server or in the computing device, on a first end-user device to allow a first user selecting one selected file or one selected folder from the metadata displayed and request metadata of the selected file or folder to be posted to a second user interface;
      store the metadata, but not content, of the selected file or the selected folder according to the request for the posting received from the first end-user device; and
      display to a second user the stored metadata of the selected file or the selected folder in the second user interface on a second end-user device to allow a second user access to the content of the selected file or folder via the stored metadata displayed in the second user interface.

18. The collaboration system as recited in claim 17, wherein said network comprises one of a corporate intranet, an internet, a wide area network, or a local area network.

19. The collaboration system as recited in claim 17, wherein each of the computing device and the server is operable to execute and respond to a request for access to the content of the selected file or folder, wherein the content of the selected folder contains at least one first file, or one first subfolder, the first subfolder may further comprise at least one second file or one second subfolder.

20. The collaboration system as recited in claim 17, wherein each of the first and second user interfaces is dispalble via execution of a web browser, wherein said displaying metadata information of a file or folder comprises displaying a graphic indicator to represent the file or folder.

* * * * *

UNITED STATES PATENT AND TRADEMARK OFFICE
CERTIFICATE OF CORRECTION

PATENT NO.        : 8,713,442 B2                        Page 1 of 1
APPLICATION NO.   : 13/080007
DATED             : April 29, 2014
INVENTOR(S)       : Sheng Tai Ted Tsao It is certified that error appears in the above-identified patent and that said Letters Patent is hereby corrected as shown below:

IN THE CLAIMS:

Two occurrences in col. 22, line 8, Claim 1; two occurrences in col. 23, line 13, Claim 9; and two occurrences in col. 24, line 31, Claim 17, please replace "one selected" with ---one---;

In col. 22, line 11, Claim 1, and lines 49-50, Claim 6; in col. 23, line 17, Claim 9; and in col. 24, line 55, Claim 20, please replace "metadata information" with ---metadata---;

In col. 22, line 47 and line 55, Claim 6; and in col. 23, line 51, Claim 13, please replace "information" with ---metadata---;

In col. 23, line 10 and line 21, Claim 9; in col. 24, line 1, Claim 13, line 28 and line 37, Claim 17; in col. 23, line 45, Claim 12; and in col. 24, line 1, Claim 13, please replace "display" with ---cause displaying---;

In col. 23, line 8, Claim 9, please replace "program code" with ---program code in a storage medium---;

In col. 24, line 49, Claim 19, please replace "contains" with ---comprises---;

In col. 24, line 50, Claim 19, please replace "may" with ---operable to---;

In col. 24, lines 53-54, Claim 20, please replace "dispalble" with ---operable to be displayed in---.

Signed and Sealed this
First Day of July, 2014

Michelle K. Lee
*Deputy Director of the United States Patent and Trademark Office*